(12) United States Patent
Goldberg et al.

(10) Patent No.: US 11,614,952 B2
(45) Date of Patent: Mar. 28, 2023

(54) SYSTEMS AND METHODS FOR PROVIDING MODULAR APPLICATIONS WITH DYNAMICALLY GENERATED USER EXPERIENCE AND AUTOMATIC AUTHENTICATION

(71) Applicant: Imageteq Technologies, Inc., Burlingame, CA (US)

(72) Inventors: Leonard Goldberg, San Francisco, CA (US); Rajendra Kumar Jena, San Ramon, CA (US)

(73) Assignee: Imageteq Technologies, Inc., Burlingame, CA (US)

( * ) Notice: Subject to any disclaimer, the term of this patent is extended or adjusted under 35 U.S.C. 154(b) by 378 days.

(21) Appl. No.: 16/052,141

(22) Filed: Aug. 1, 2018

(65) Prior Publication Data
US 2019/0079782 A1 Mar. 14, 2019

Related U.S. Application Data

(60) Provisional application No. 62/558,033, filed on Sep. 13, 2017.

(51) Int. Cl.
*G06F 9/451* (2018.01)
*G06F 9/54* (2006.01)
(Continued)

(52) U.S. Cl.
CPC ............... *G06F 9/451* (2018.02); *G06F 9/54* (2013.01); *G06F 16/907* (2019.01); *G06N 20/00* (2019.01);
(Continued)

(58) Field of Classification Search
CPC .......... G06F 9/451; G06F 9/54; G06F 16/907; G06N 20/00; H04L 9/321; H04L 9/3226;
(Continued)

(56) References Cited

U.S. PATENT DOCUMENTS 6,321,339 B1 * 11/2001 French .................. G06F 21/33
726/2
6,460,141 B1 * 10/2002 Olden ................... G06F 21/604
726/12

(Continued)

FOREIGN PATENT DOCUMENTS

WO 2013074750 A1 5/2013

*Primary Examiner* — Thanh T Le
(74) *Attorney, Agent, or Firm* — FisherBroyles, LLP; Thomas J. Osborne, Jr.

(57) ABSTRACT

Systems for providing an integrated user interface and/or authenticating a user or a device are disclosed. A system for providing an integrated user interface includes a central control server having a user interface engine and a backend application programming interface engine, a user device communicatively coupled to the central control server that is configured to provide a user interface, and a plurality of backend servers communicatively coupled to the central control server. The backend application programming interface engine generates and supplies application programming interfaces to the backend servers, the application programming interfaces including programming instructions thereon that direct a corresponding one of the plurality of backend servers to provide data to the central control server. The user interface engine generates the integrated user interface comprising the data received from the plurality of backend servers and provides the integrated user interface to the user device for display to a user.

29 Claims, 15 Drawing Sheets

(51) Int. Cl.
*G06F 16/907* (2019.01)
*G06N 20/00* (2019.01)
*H04L 67/303* (2022.01)
*H04L 67/565* (2022.01)
*H04L 9/32* (2006.01)
*H04L 9/40* (2022.01)
*H04L 67/50* (2022.01)

(52) U.S. Cl.
CPC ............ *H04L 9/321* (2013.01); *H04L 9/3226* (2013.01); *H04L 9/3231* (2013.01); *H04L 63/0876* (2013.01); *H04L 67/303* (2013.01); *H04L 67/535* (2022.05); *H04L 67/565* (2022.05); *H04L 63/104* (2013.01); *H04L 63/107* (2013.01)

(58) Field of Classification Search
CPC ... H04L 9/3231; H04L 63/0876; H04L 67/22; H04L 67/2823; H04L 67/303; H04L 67/535; H04L 67/565; H04L 63/104; H04L 63/107
USPC .......................................................... 713/168
See application file for complete search history.

(56) References Cited

U.S. PATENT DOCUMENTS

| | | | |
|---|---|---|---|
| 7,708,196 B2 | 5/2010 | Palmieri et al. | |
| 8,925,053 B1* | 12/2014 | Mehta | G06F 21/31 726/4 |
| 8,935,768 B1* | 1/2015 | Tyree | H04L 63/08 726/7 |
| 8,984,541 B1 | 3/2015 | Brown et al. | |
| 9,058,563 B1* | 6/2015 | Krueger | G06F 3/0482 |
| 9,178,880 B1* | 11/2015 | Dotan | H04W 12/068 |
| 9,438,681 B2 | 9/2016 | Middleton et al. | |
| 10,104,527 B1* | 10/2018 | Keil | H04W 68/005 |
| 10,381,105 B1* | 8/2019 | Tran | G16B 20/00 |
| 2003/0217137 A1* | 11/2003 | Roese | H04L 67/18 709/223 |
| 2008/0077809 A1* | 3/2008 | Hayler | H04L 63/0428 713/193 |
| 2008/0271109 A1* | 10/2008 | Singh | H04L 63/102 726/4 |
| 2010/0070319 A1* | 3/2010 | Prafullchandra | G06Q 10/06 726/22 |
| 2011/0209069 A1* | 8/2011 | Mohler | H04L 67/24 715/744 |
| 2012/0016678 A1* | 1/2012 | Gruber | H04M 1/7243 704/E21.001 |
| 2013/0041756 A1 | 2/2013 | Carion et al. | |
| 2013/0125226 A1* | 5/2013 | Shah | H04L 63/0815 726/7 |
| 2013/0198113 A1* | 8/2013 | Ray | G06Q 30/0251 706/12 |
| 2013/0333002 A1* | 12/2013 | Belton | H04L 63/10 726/5 |
| 2014/0089320 A1 | 3/2014 | Baldwin et al. | |
| 2014/0279811 A1* | 9/2014 | Su | G05B 13/0265 706/48 |
| 2014/0280007 A1* | 9/2014 | Gardner | G06Q 30/08 707/706 |
| 2014/0365313 A1* | 12/2014 | Reese | G06Q 30/0269 705/14.66 |
| 2015/0089632 A1* | 3/2015 | Bartholomew | G06F 21/629 726/17 |
| 2015/0199609 A1* | 7/2015 | Rao | G06N 20/00 706/12 |
| 2015/0242891 A1* | 8/2015 | Mimran | G06Q 30/0255 705/14.53 |
| 2016/0127352 A1* | 5/2016 | Xu | H04L 63/0815 726/8 |
| 2016/0227045 A1 | 8/2016 | Hunt et al. | |
| 2017/0142191 A1* | 5/2017 | Caldwell | H04L 63/0428 |
| 2018/0034802 A1* | 2/2018 | Shelton | G06F 21/46 |
| 2018/0039956 A1* | 2/2018 | McElhinney | G06N 20/00 |
| 2018/0075513 A1* | 3/2018 | Bastide | G06Q 30/0631 |
| 2018/0164970 A1* | 6/2018 | Volkerink | G06F 3/0484 |
| 2018/0181412 A1* | 6/2018 | Paratey | G06F 3/011 |
| 2018/0295120 A1* | 10/2018 | Dawson | H04L 9/3226 |
| 2018/0302300 A1* | 10/2018 | Moeller-Bertram | H04L 63/1433 |
| 2019/0050945 A1* | 2/2019 | Ash | G06F 16/435 |
| 2019/0073601 A1* | 3/2019 | Alkan | G06N 20/00 |
| 2020/0327821 A1* | 10/2020 | Holzheimer | G09B 5/065 |

* cited by examiner

| Sample Recognition Parameters (SRP) | Confidence Level for AuthN - "A" |
|---|---|
| Facial recognition | 9 |
| Voice recognition | 8 |
| Fingerprint | 9 |
| Hair color | 1 |
| Eye color | 1 |
| Clothes | 1 |
| Heat signature | 3 |
| Body odor | 6 |
| Touch/tap pattern (door knock pattern) | 4 |
| PIN code | 6 |

FIG. 11A

| Sample OBS Data Retrieved/Updated (SOD) | Required AuthN Level - "B" |
|---|---|
| Bill amount | 6 |
| Email address on record | 9 |
| Mother's maiden name | 9 |
| Date bill due | 3 |
| Emergency contact name | 5 |
| Emergency contact TN | 7 |
| Favorite food (lookup) | 3 |
| Favorite music (lookup) | 2 |
| PIN (lookup or update) | 10 |
| SSN (lookup or update) | 10 |

FIG. 11B

SYSTEMS AND METHODS FOR PROVIDING MODULAR APPLICATIONS WITH DYNAMICALLY GENERATED USER EXPERIENCE AND AUTOMATIC AUTHENTICATION

CROSS-REFERENCE TO RELATED APPLICATION

This application claims the benefit of U.S. Provisional Application Ser. No. 62/558,033, filed on Sep. 13, 2017 and entitled "Systems and Methods for Providing or Developing Modular Applications with Dynamically Generated User Experience and Automatic Individual or Group Authentication," the contents of which are hereby incorporated by reference in its entirety.

TECHNICAL FIELD

The present specification generally relates to systems and methods for providing a user interface and authenticating users and, more specifically, to systems and methods for providing an integrated user interface across a plurality of different platforms and a plurality of different services, and also to systems and methods for automatically authenticating users of the integrated user interface.

BACKGROUND

Existing software programs that provide an integrated user interface that interacts with a plurality of different services that may be maintained by different entities typically require an excessive amount of coding, an excessive amount of data storage space, and an excessive amount of processing power. In addition, existing software programs that authenticate users may periodically require a user to re-authenticate themselves, which requires additional processing power and is inconvenient for users.

SUMMARY

In an embodiment, a system for providing an integrated user interface includes a central control server having a user interface engine and a backend application programming interface engine, a user device communicatively coupled to the central control server, the user device configured to provide a user interface, and a plurality of backend servers communicatively coupled to the central control server. The backend application programming interface engine generates and supplies one or more application programming interfaces to the plurality of backend servers, the one or more application programming interfaces including one or more programming instructions thereon that direct a corresponding one of the plurality of backend servers to provide data to the central control server. The user interface engine generates the integrated user interface comprising the data received from the plurality of backend servers and provides the integrated user interface to the user device for display to a user.

In another embodiment, a system for providing an integrated user interface and for authentication, the system including a central control server having a user interface engine, a backend application programming interface engine, and an authentication engine, a user device communicatively coupled to the central control server, the user device configured to provide a user interface, a second device communicatively coupled to the central control server, and a plurality of backend servers communicatively coupled to the central control server. The backend application programming interface engine generates and supplies one or more application programming interfaces to the plurality of backend servers, the one or more application programming interfaces including one or more programming instructions thereon that direct a corresponding one of the plurality of backend servers to provide data to the central control server. The user interface engine generates the integrated user interface comprising the data received from the plurality of backend servers and provides the integrated user interface to the user device for display to a user. The authentication engine authenticates the second device based on a fuzzy logic analysis of metadata obtained regarding the second device.

In yet another embodiment, a system for providing an integrated user interface includes a central control server having a user interface engine, a backend application programming interface engine, an artificial intelligence and machine learning component, and an authentication engine, a user device communicatively coupled to the central control server, the user device configured to provide a user interface, and a plurality of backend servers communicatively coupled to the central control server. The authentication engine authenticates the user device and the backend application programming interface engine generates and supplies one or more application programming interfaces to the plurality of backend servers, the one or more application programming interfaces including one or more programming instructions thereon that direct a corresponding one of the plurality of backend servers to provide data to the central control server. The artificial intelligence and machine learning component determines one or more portions of the data received from the backend servers that is likely to be accessed by the user and provides the one or more portions of the data. The user interface engine generates the integrated user interface comprising the data received from the plurality of backend servers and the one or more portions of the data provided by the artificial intelligence and machine learning component, and provides the integrated user interface to the user device for display to a user.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 11A depicts a table of illustrative confidence levels for particular recognition parameters according to one or more embodiments shown and described herein;

FIG. 11B depicts a table of illustrative levels of required authorization necessary for particular data accesses according to one or more embodiments shown and described herein;

DETAILED DESCRIPTION

Figure 1:
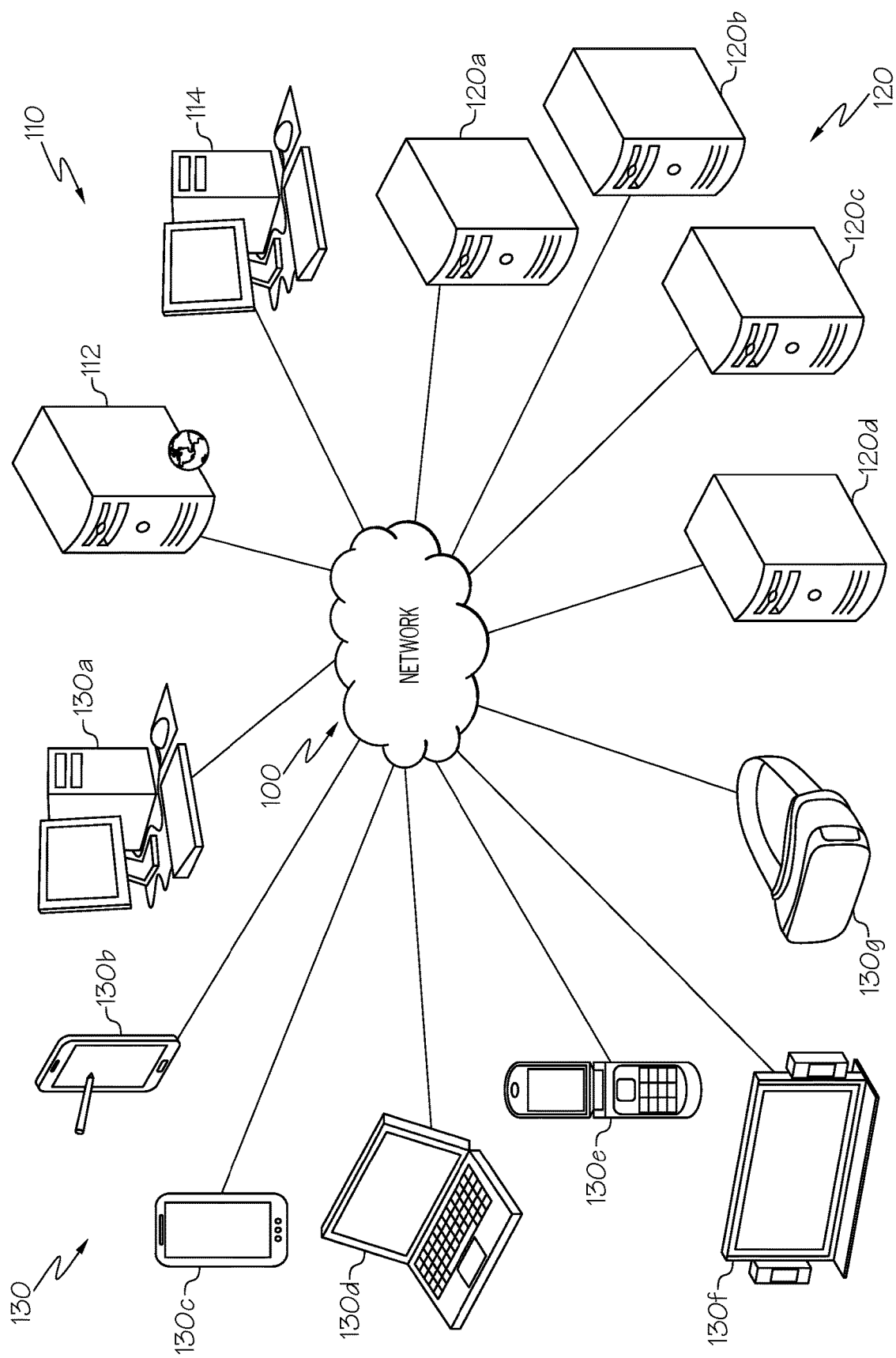
FIG. 1 schematically depicts an illustrative computing network including an integrated user interface server according to one or more embodiments shown and described herein.

The embodiments described herein are generally directed to systems and methods that communicate with a plurality of different backend systems (which may be maintained by one or more providers) and transmit data between the plurality of different backend systems and a user via an integrated user interface. Such systems and methods may include a central component, which may generally be referred to as a transactional application core component (TACC), a user interface component, and a backend component. The TACC generally stands between the user interface component and the backend component (which includes the plurality of different backend systems). The TACC provides the user with a consistent interface that is the same regardless of the backend systems that are accessed and regardless of the device or operating system used by the user, so as to make the overall user interactions as efficient and seamless as possible. In addition, the systems and methods described herein can complete various authentication and authorization tasks in the background according to various authorization/authentication requirements, which can also include authenticating a group of users collectively. Since these various authentications and authorization tasks may occur in the background, a user can be re-authenticated and re-authorized in a manner that ensures that security protocols required by an application, a backend system, and/or the like are met. The systems and methods described herein provide the above-mentioned functionality by incorporating a backend API engine in the TACC that generates and provides an API or other similar mechanism to the backend systems to allow connectivity between the TACC and the backend systems.

Software applications, such as computer applications, web-based applications, mobile applications, and/or the like, sometimes require a connection to a backend system to send and retrieve data from the backend system for displaying to a user of the software application. A device typically has a software application for each service that is accessed. For example, a mobile device may have an installed "app" that is specific to a particular service to be accessed (e.g., an app for each of one or more banking services, an app for each of one or more music services, an app for an email service, and/or the like). In addition, since each application may connect to a corresponding backend system, the devices on which the software applications run may require a large amount of storage space to run each application. That is, each software application that is used to access a particular service must be downloaded and installed on the device, which can become unwieldy in instances where a large number of services are accessed. Additionally, a user may switch between applications for different services, which may be time consuming, cumbersome, and require an excessive amount of processing power, memory storage, and/or the like (e.g., when temporarily unused applications are left running in the background after switching applications). Further, each individual application may require a user to log in or otherwise authenticate himself/herself and/or re-authenticate after a period of time, which may be inconvenient to the user and may use excessive processing power to processes additional authentication re-authentication requests. Authentication or re-authentication may also be necessary each time the user switches between applications, thereby requiring further inconvenience to the user and excessive processing power. Also, there does not exist an ability to authenticate/re-authenticate a group of users or provide information to a group of users.

Previous solutions have included use of a singular application that is run on a computing device and provides access to a plurality of services to a user. Such singular applications provide an interface to a user based on a mechanism that allows for connecting to a corresponding backend system to send or retrieve data, such as an application programming interface (API). Developers of such mechanisms create point-to-point connectivity and custom code to extract data from the backend systems, which results in multiple changes to application code when the singular application changes from one backend system to another and/or when additional backend systems are linked. This approach is error prone, time consuming, and expensive (both computationally and financially). In addition, the mechanism may require different programming depending on the platform used by the user, which results in multiple APIs for each platform. Coding and developing such APIs, particularly in an evolving technological environment where new devices and platforms are created frequently, can be expensive and time consuming. Moreover, the processing power and digital storage necessary to implement additional coding increases exponentially.

In addition, software developers and/or users may wish to pick and choose only certain functionality or information that is accessible through a singular application. To be able to do so, a developer of a singular application would necessarily have to deploy the application in a plurality of different combinations of functional modules for each implementation, which may require coding the application in a particular manner and/or creating a plurality of versions of the same application to access data from the backend systems, which is time consuming and expensive (both computationally and financially). In addition, the plurality of versions require an excessive amount of digital storage space.

Accordingly, a need exists for systems and methods that provide an integrated user interface on a computing device, the integrated user interface providing access to a plurality of different services by connecting to each of a plurality of backend systems using a common mechanism to send and retrieve data with the plurality of backend systems. A need further exists to automatically authenticate and re-authenticate a user and/or a group of users. These needs are necessary to reduce the amount of coding that is necessary to provide a user interface, reduce the amount of storage that is necessary to store data relating to the user interface, reduce the amount of processing power that is necessary to run multiple versions of an interface, reduce the amount of processing power that is necessary to authenticate and/or re-authenticate a user or a group of users, and/or the like.

As a user interacts with an application on a user interface (e.g., a display, voice-based user interface, a touch-based user interface, and/or the like), the actions of the user may cause the application to retrieve information from one or more remote systems, insert information into one or more remote systems, and/or update information into one or more systems. The TACC system stands between the user interface, covering any type or number of user-interfacing channels and any type or number of backend systems. The purpose of the TACC is to make the overall user interactions as efficient and seamless as possible, in effect approaching a virtual "mind meld" between a user and the backend systems. The TACC includes a modular design that enables connectivity between any type of user interface (UI) channel and any type of backend system. In addition, the TACC ensures that the user experience and user interface for any type of UI or user experience (UX) (e.g., web, mobile, voice, TV, and/or the like) will dynamically change from user to user and/or situation to situation and will be customized for each user based on history, social media, location, time and/or other public or opt-in information. The TACC further ensures that authentication and authorization is completed automatically in the background by matching available authentication data to the desired system data. A user may also be re-authenticated or re-authorized in the background by the TACC to enforce security protocols put in place by the backend systems. The TACC may also implement group user experiences with an automatic group-based authentication in addition to just merely an individual's user experience.

As used herein, the term "backend system" refers to systems that store data used for business processes, information flows, reporting, planning, and/or the like on a server or other computing device that is generally remote from a device hosting a user interface. Such backend systems may also include systems and applications that provide data, information, business rules, business logic, and/or the like. Backend systems may also be referred to as "systems of record" depending on the specific type of data, information, or business logic contained within such systems. Illustrative examples of backend systems include, but are not limited to, customer relationship management (CRM) systems and other systems used for customer services, enterprise resource planning (ERP) (e.g., systems provided by SAP®, Oracle®, SalesForce® etc.), database systems (e.g., systems provided by Oracle®, SAP HANA®, Sybase® etc.); embedded systems, vehicle automation systems, automobile self-driving systems, other robotic systems (e.g. robot assistants, drones, etc.), security databases (such as databases that utilize Active Directory® (Microsoft Inc., Redmond Wash.), lightweight directory access protocol (LDAP), or the like), accounting databases, electronic bill pay databases, other financial system databases, procurement systems, sales systems; mapping systems; systems that hold user or customer data, and medical records systems. Other systems not specifically described herein should generally be understood.

FIG. 1 depicts an illustrative computing network that depicts components for a system that provides an integrated user interface according to embodiments shown and described herein. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more electronic devices and/or components thereof. Illustrative electronic devices may include, but are not limited to, one or more central control devices 110 such as a central control server 112 (e.g., a TACC server) and/or a central control user computing device 114 (e.g., a TACC user computing device), one or more backend devices 120 (including, but not limited to, a first backend device 120a, a second backend device 120b, a third backend device 120c, and a fourth backend device 120d), and/or one or more user devices 130. The user devices 130 are generally devices that are used by a user to interact with the various other components of the computer network 100, as described herein. Illustrative examples of the user devices 130 include, but are not limited to, a personal computing device 130a, a tablet computing device 130b, a smartphone device 130c, a portable computing device 130d, a mobile phone 130e, a connected television 130f, and a virtual reality headset 130g. It should be understood that such devices are merely illustrative, and that any other device that provides a form of user interface, such as a smart watch, a fitness band, a vehicle assistant, an in-home assistive device (e.g., smart speaker, home automation hub, etc.) or the like, may also be included as a user device 130 without departing from the scope of the present disclosure.

The central control user computing device 114 and the one or more user devices 130 may each generally be used as an interface between a user and the other components connected to the computer network 100, whether or not specifically described herein. Thus, the central control user computing device 114 and the one or more user devices 130 may be used to perform one or more user-facing functions, such as receiving one or more inputs from a user or providing information to the user. Additionally, in the event that the central control server 112 requires oversight, updating, or correction, the central control user computing device 114 may be configured to provide the desired oversight, updating, and/or correction. The central control user computing device 114 and the one or more user devices 130 may also be used to input additional data into a data storage portion of the central control server 112 and any one of the backend devices 120. Illustrative examples of the central control user computing device 114 include a smartphone, a tablet, a personal computer, and/or the like. In some embodiments, the central control user computing device 114 and/or the one or more user devices 130 may be a generic device that can be loaded with a software program, module, and/or the like to provide the functionality described herein. In other embodiments, central control user computing device 114 and/or the one or more user devices 130 may be a specialized device that is particularly designed and configured to provide the functionality described herein.

The central control server 112 may receive electronic data and/or the like from one or more sources (e.g., the central control user computing device 114, one or more of the backend devices 120, one or more of the user devices 130, and/or one or more databases), direct operation of one or more other devices (e.g., the central control user computing device 114, one or more of the backend devices 120, and/or one or more of the user devices 130), contain data relating to providing the integrated user interface, and/or the like.

Any one of the backend devices 120 may receive electronic data and/or the like from one or more sources (e.g., the central control user computing device 114, the central control server 112, one or more of the user devices 130, and/or one or more databases), direct operation of one or more other devices (e.g., the central control user computing device 114, the central control server 112, and/or one or more of the user devices 130), contain data relating to a particular service provided to a user of one of the user devices 130, and/or the like. It should be understood that each one of the backend devices 120 may be provided, operated, and/or maintained by an entity that is separate from entities providing, operating, and/or maintaining other ones of the backend devices 120, the central control server 112, the central control user computing device 114, and/or the one or more user devices 130.

It should be understood that while the personal computing device 130a, the portable computing device 130d, and the central control user computing device 114 are depicted as personal computers, and the central control server 112 and the backend devices 120 are depicted as servers, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the central control devices 110, the backend devices 120, and the user devices 130 may represent a plurality of computers, servers, databases, mobile devices, components, and/or the like.

In addition, while the present disclosure generally relates to computing devices, the present disclosure is not limited to such. For example, various electronic devices that may not be referred to as computing devices but are capable of providing functionality similar to the computing devices described herein may be used. Illustrative examples of electronic devices include, for example, certain electronic medical equipment, Internet-connected electronic devices (such as certain communications devices), and/or the like. Other examples of electronic devices should generally be understood and are included within the scope of the present disclosure.

In some embodiments, the network of computing devices may be a specialized network of devices that is particularly configured to provide the functionality described herein. Such a specialized network, by eliminating unnecessary components or functionality, may be able to operate more quickly and/or efficiently to provide an integrated user interface relative to a generic computer network that allows connection between connected devices. Moreover, such functionality, despite being wholly within one or more computing devices, improves the functionality of the computing devices by working in an unconventional manner to more efficiently provide a user interface that results from data retrieved from a plurality of backend devices, each utilizing its own unique code. In addition, it should be understood that less processing power is necessary to complete the various processing steps described herein, and less data storage is necessary to store coding relating to providing a user interface and providing a connection to the backend devices 120, thereby improving the functionality of the computing devices that execute the processes described herein.

Figure 2A:
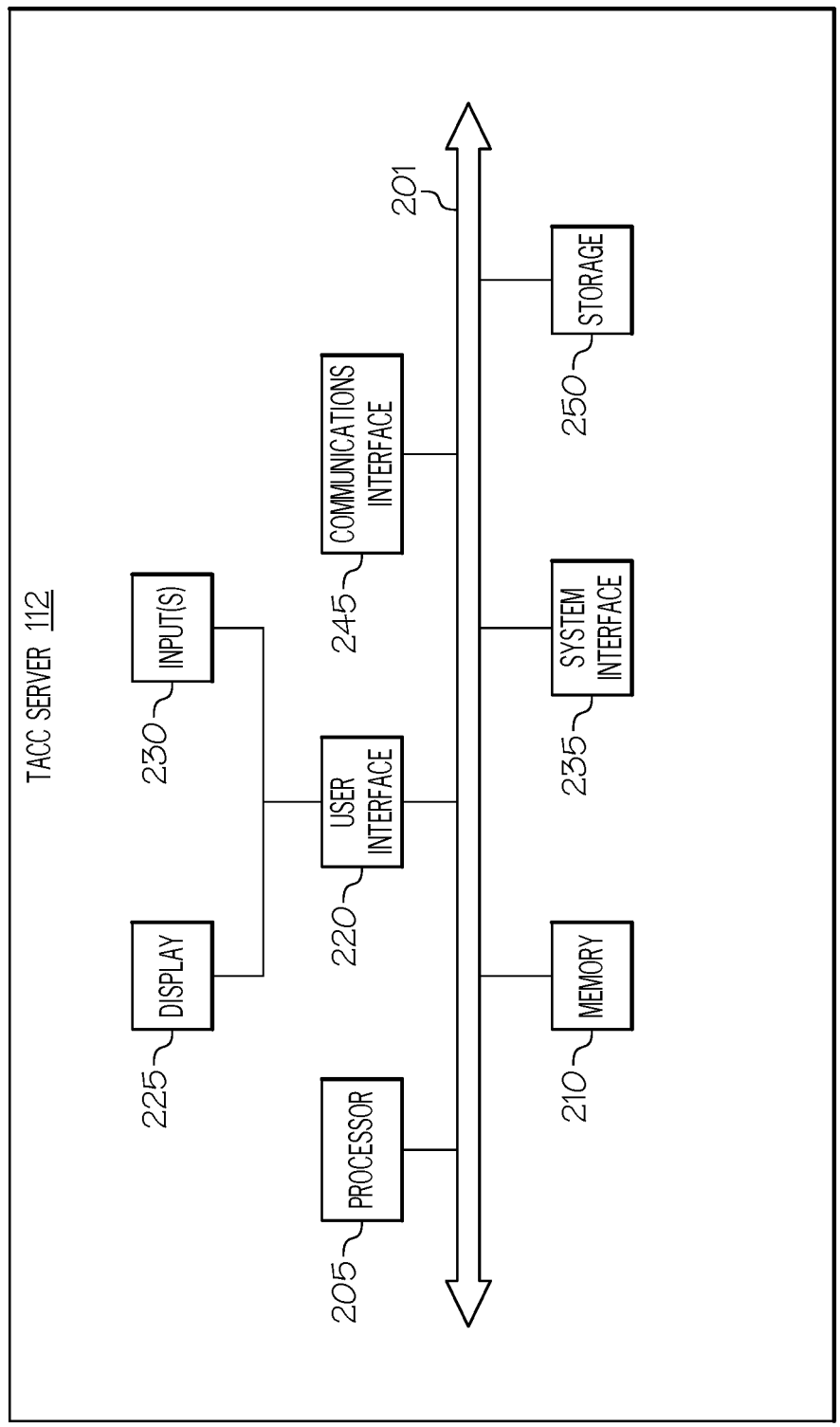
FIG. 2A schematically depicts a block diagram of illustrative hardware of an integrated user interface server computing device according to one or more embodiments shown and described herein.

Illustrative hardware components of the central control server 112 (which may be also be referred to as TACC server) are depicted in FIG. 2A. A bus 201 may interconnect the various components. A processing device 205, such as a computer processing unit (CPU), may be the central processing unit of the computing device, performing calculations and logic operations required to execute a program. The processing device 205, alone or in conjunction with one or more of the other elements disclosed in FIG. 2A, is an illustrative processing device, computing device, processor, or combination thereof, as such terms are used within this disclosure. Memory 210, such as read only memory (ROM) and random access memory (RAM), may constitute an illustrative memory device (i.e., a non-transitory processor-readable storage medium). Such memory 210 may include one or more programming instructions stored thereon that, when executed by the processing device 205, cause the processing device 205 to complete various processes, such as the processes described herein. Optionally, the program instructions may be stored on a tangible computer-readable medium such as a compact disc, a digital disk, flash memory, a memory card, a USB drive, an optical disc storage medium, such as a Blu-ray™ disc, and/or other non-transitory processor-readable storage media.

Figure 2B:
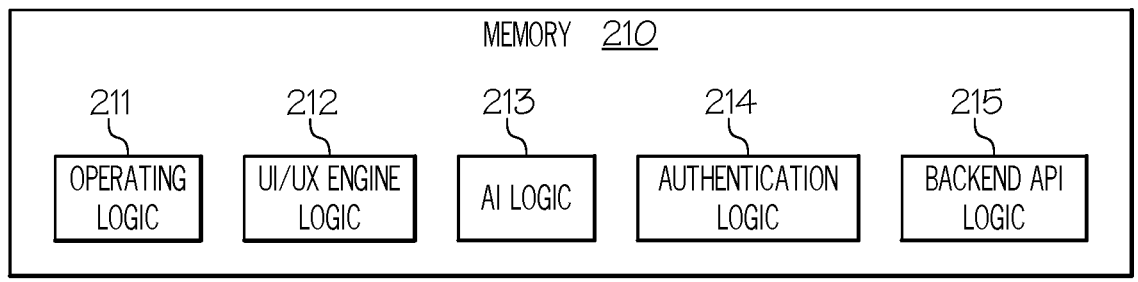
FIG. 2B schematically depicts a block diagram of illustrative software modules contained within a memory of an integrated user interface server according to one or more embodiments shown and described herein.

In some embodiments, the program instructions contained on the memory 210 may be embodied as a plurality of software modules, where each module provides programming instructions for completing one or more tasks. For example, as shown in FIG. 2B, the memory 210 may contain operating logic 211, user interface/user experience (UI/UX) engine logic 212, artificial intelligence (AI) logic 213, authentication logic 214, and/or backend API logic 215. The operating logic 211 may include an operating system and/or other software for managing components of the central control server 112 (FIG. 1). The UI/UX engine logic 212 may include one or more software modules for providing a user interface to a user, which further provides a unified user experience across any device utilized by the user to access the user interface. The AI logic 213 may include one or more software modules for providing artificial intelligence services to a user, as described in greater detail herein. The authentication logic 214 may contain one or more software modules for authenticating a user or a group of users with one or more of the backend devices 120 (FIG. 1). Still referring to FIG. 2B, the backend API logic 215 may contain one or more software modules that direct operation of a backend API engine, including generation of an API to be provided to one or more of the backend devices 120 (FIG. 1), as described in greater detail herein.

Referring again to FIG. 2A, a storage device 250, which may generally be a storage medium that is separate from the memory 210, may contain one or more data repositories for storing data relating to providing the integrated user interface, artificial intelligence data, data that is recorded as a result of authenticating a user, data that is used by a backend API engine or recorded by a backend API engine, and/or the like. The storage device 250 may be any physical storage medium, including, but not limited to, a hard disk drive (HDD), memory, removable storage, and/or the like. While the storage device 250 is depicted as a local device, it should be understood that the storage device 250 may be a remote storage device, such as, for example, cloud based storage or the like.

Figure 2C:
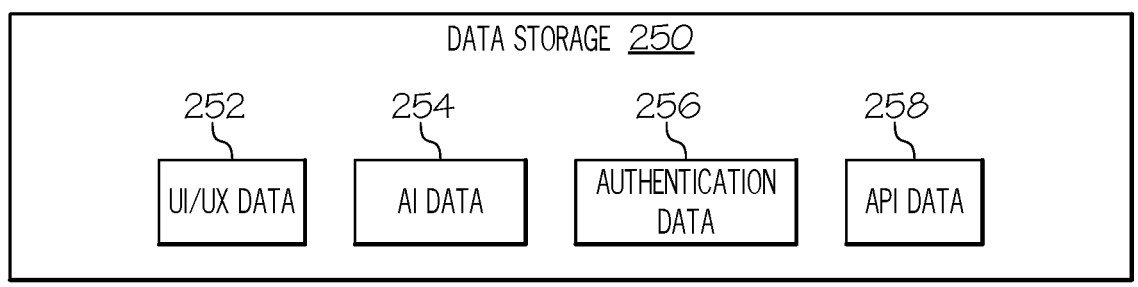
FIG. 2C schematically depicts a block diagram of illustrative data contained within a data storage component of an integrated user interface server according to one or more embodiments shown and described herein.

Illustrative data that may be contained within the storage device 250 is depicted in FIG. 2C. As shown in FIG. 2C, the storage device 250 may include, for example, UI/UX data 252, AI data 254, authentication data 256, and/or API data 258. The UI/UX data 252 is generally data that relates to the user interface provided to the user (i.e., front end data). As such, the UI/UX data 252 may be accessed by any user device when the user interface is provided to the user and/or may be written as a result of a user's interaction with a user interface. The AI data 254 may generally be data that is generated and/or recorded as a result of providing an artificial intelligence service to a user, and may contain information relating to user responses, user preferences, and/or the like; information that is generated as a result of user interaction with the AI service; information that is accessed by the AI service to interact with a user, and/or the like. The authentication data 256 may generally be data that is recorded and/or used to authenticate a user of the user interface with an application, one or more services provided by the backend devices 120 (FIG. 1), and/or the like. For example, the authentication data 256 may include user names and passwords stored by a user, cookies or other automatically retrieved data that can be used for identification, information that can be used to directly identify a particular user (as described in greater detail herein), and/or the like. It should be understood that any of the data stored as part of the authentication data 256 may be secured and/or encrypted. It should further be understood that the user names and passwords may not be a user name and password stored by a user, but rather are system generated user names and passwords that are generated to preserve the security of the user names and passwords known by the user (which may be stored in the user's personal user device, such as the one or more user devices 130 described herein with respect to FIG. 1. Still referring to FIG. 2C, the API data 258 may generally be data relating to the backend API engine, including data that is generated by the backend API engine and provided to the one or more backend devices 120 (FIG. 1), data that is received by the backend API engine, and/or the like.

Referring again to FIG. 2A, an optional user interface 220 may permit information from the bus 201 to be displayed on a display 225 portion of the computing device in audio, visual, graphic, or alphanumeric format. Moreover, the user interface 220 may also include one or more inputs 230 that allow for transmission to and receipt of data from input devices such as a keyboard, a mouse, a joystick, a touch screen, a remote control, a pointing device, a video input device, an audio input device, a haptic feedback device, and/or the like. Such a user interface 220 may be used, for example, to allow a user to interact with the computing device or any component thereof. In some embodiments, the user interface 220 may not be local to the central control server 112, but rather may be located on the central control user computing device 114 (FIG. 1) and/or the one or more user devices 130.

Still referring to FIG. 2A, a system interface 235 may generally provide the computing device with an ability to interface with one or more of the components of the computer network 100 (FIG. 1). Communication with such components may occur using various communication ports (not shown). An illustrative communication port may be attached to a communications network, such as the Internet, an intranet, a local network, a direct connection, and/or the like.

A communications interface 245 may generally provide the computing device with an ability to interface with one or more external components, such as, for example, an external computing device, a remote server, and/or the like. Communication with external devices may occur using various communication ports (not shown). An illustrative communication port may be attached to a communications network, such as the Internet, an intranet, a local network, a direct connection, and/or the like.

It should be understood that the components illustrated in FIGS. 2A-2C are merely illustrative and are not intended to limit the scope of this disclosure. More specifically, while the components in FIGS. 2A-2C are illustrated as residing within the central control server 112, this is a nonlimiting example. In some embodiments, one or more of the components may reside external to the central control server 112. Similarly, one or more of the components may be embodied in other computing devices, including computing devices not specifically described herein.

Figure 3:
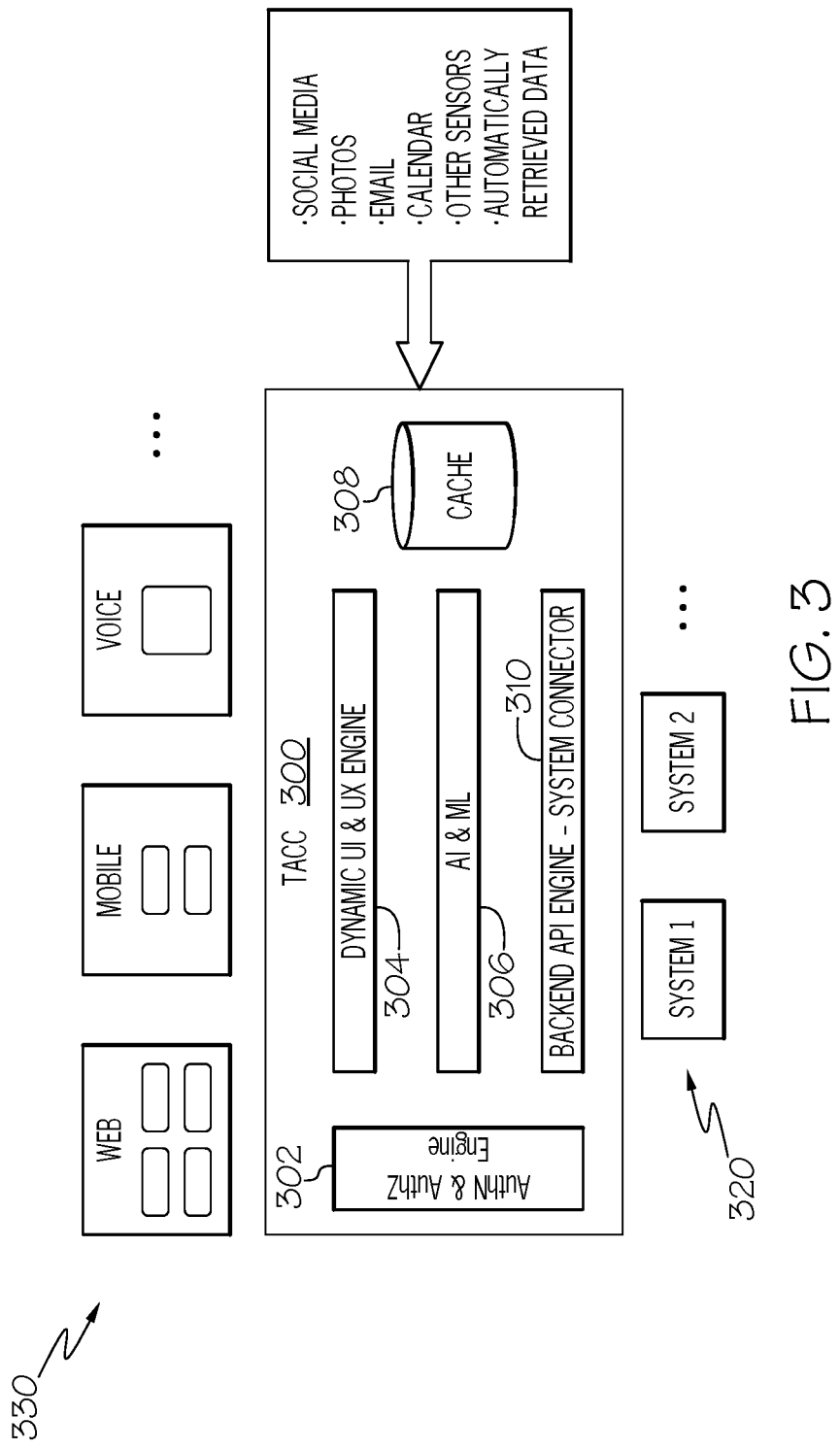
FIG. 3 depicts a block diagram of a general design of an illustrative system providing an integrated user interface according to one or more embodiments shown and described herein.

FIG. 3 depicts a block diagram of the general structure of the TACC 300 (i.e., a software component of the central control server 112 as described in FIG. 1), as well as connectivity with the backend systems 320 (i.e., software components of the backend devices 120 as described in FIG. 1) and one or more user interface channels 330 provided by the one or more user devices 130, as described herein with respect to FIG. 1. Still referring to FIG. 3, the various software components of the TACC 300 include, but are not limited to, an authentication engine 302 (i.e., AuthN and AuthZ engine), a dynamic UI & UX engine 304, an artificial intelligence and machine learning component 306, a cache 308, and a backend API engine 310. The TACC 300 may generally be configured to proactively propose actions and provide a dynamically-generated user experience via the dynamic UI & UX engine 304 based on a historical pattern of user behavior. Such a historical pattern of user behavior may include, for example, behavior recorded by the TACC 300, behavior obtained from data received from external sources, such as the backend systems 320, and/or the like. Data that includes information regarding such behavior may include, but is not limited to, social media data, email data, calendar data, e-commerce data (e.g., shopping/browsing history), and news site data (e.g., articles accessed/read). For example, social media data may indicate a particular user's behavior when interacting with other individuals online, behavior in sharing certain views and responding to others' views, behavior relating to the amount of time spent using a social media platform, and/or the like. Other behaviors that may be observed from social media data, email data, calendar data, e-commerce data, news site data and/or the like may include a list of friends, family members, colleagues, and/or the like that the user interacts with regularly, how often a user uses his/her email or calendar, the content of emails and calendars, shopping and browsing trends, political leanings, interests, and/or the like. Other behaviors should generally be understood and are included within the scope of the present disclosure.

The dynamic UI & UX engine 304 may further complete dynamic transactions. Dynamic transactions may generally be related to decision making in a fuzzy environment: More specifically, the dynamic UI & UX engine may automatically gather information needed for decision making, then assign a level of confidence to various data points that are needed for decision making. Any data point for which sufficient level of confidence is available may require additional probing (actions) to increase the level of confidence. Such actions may be reactive or proactive. Reactive actions may be, for example, automatically gathering information as an environment changes that could affect the level of confidence. Proactive actions may be, for example, requiring some kind of a human intervention to answer questions or verify individuals, matter, and/or the like. This may be necessary if the system is attempting to fulfil a request that requires a level of confidence higher than that of the currently assigned value. This concept applies not only to authenticating an user, but also for system-to-system authentication, system-to-device authentication, and device-to-device authentication. That is, one system may use various criteria described herein to identify another system or device. Examples of another system or device include, but are not limited to, self-driving cars, robots, application programs, smart home automation devices, smartphones, smart TVs, drones, and/or the like. As such, the systems and methods described herein can be used to authenticate two systems (or a system and a device or two devices) together so that they can be paired for combined use by a user (e.g., authenticating a smart TV with a user's mobile phone such that the two devices pair together and the user can use the mobile phone to control the smart TV).

The behavior may be learned using the artificial intelligence and machine learning component 306, thereby saving time on multiple steps and waiting to react to user comments supplied via the one or more user interface channels 330 and improving system functionality by increasing processing speed. More specifically, the artificial intelligence and machine learning component 306 may receive the information and utilize one or more machine learning algorithms to learn the behavior. It should be understood that any machine learning algorithm now known or later developed may be utilized. The TACC 300 may further utilize the cache 308 to preload and/or cache data from the backend systems 320 such that information from the backend systems 320 can be provided to a user of the user interface channels 330 more quickly than may be possible if the data were accessed directly from the backend systems 320, thereby further improving computer functionality by speeding up processing times. Data may be selected based on predictions determined by the artificial intelligence and the machine learning component 306 to provide a more predictive customer experience for transactional actions. That is, based on the learned behavior described herein, the artificial intelligence and the machine learning component 306 may predict what a user may desire to access at a particular time, given particular circumstances, and/or the like, and may preload data into the cache 308 in anticipation thereof. The cache 308 may further be used to temporarily save data received from a user via the user interface channels 330 and perform save operations to data storage (e.g., data storage in the backend systems 320) during low load periods (i.e., periods having lower data activity), thereby improving performance of the computing device.

The arrangement of the TACC 300 as described herein may provide advantages over other systems that exist between a user interface and a backend system because the TACC 300 does not require users of the user interface channels 330 to complete a plurality of steps to access data (e.g., authenticating with each backend system 320, entering the same information more than once, and/or the like). In addition, due to the inherent limitations of the APIs provided by the backend systems, other systems that exist between a user interface and a backend system cannot only access data that is pertinent to the data requested by the user. As such, all data is accessed (including non-relevant data) and is filtered out before being presented to the user and/or the non-relevant data is also provided to the user. Such a distribution of data can tax bandwidth, require excessive processing power, and/or present a disjointed and noisy interface to a user. Use of the TACC 300, particularly the backend API engine 310 thereof, avoids such issues because the backend API engine 310 is particularly coded such that only relevant data is retrieved from the backend systems 320. In addition, the systems described herein allow the user interface channels 330 to be presented dynamically because they can be easily customized to a user's preferences and need not be defined by an API from a backend system, as is the case with other systems that exist between a user interface and such backend systems. Similarly, the TACC can update the user interface channels 330 to add functionality, remove functionality, and/or the like without the need for custom coding that conforms to an API presented by a backend system, as is the case with other systems that exist between a user interface and such backend systems. In addition, the TACC 300, via the backend API engine 310, can provide a single API to each backend system 320 as the functionality of such backend systems 320 are added to the system described herein, which obviates the need for custom integration coding for every backend system that is added, as required by other systems that exist between a user interface and such backend systems.

In addition to providing connectivity between the user interface channels 330 and the backend systems 320 and providing suggestions to users using the artificial intelligence and machine learning component 306, the TACC 300 may also intelligently authenticate one or more users based on the system accessed, the type of data accessed, the number of users accessing the data, one or more user characteristics, one or more user preferences, and/or the like. More specifically, in some instances, it may not be necessary to definitively identify a user. Depending on the task being performed or the information disseminated by the backend server, it may be sufficient to estimate who the user is without actually determining the user's identity. For example, if a user requests information regarding the weather, it may not be necessary to identify the user, but merely locations important to the user, such as a current location of the user, an upcoming location of the user, and/or the like, which may be based on obtained data described herein. However, it should be understood that for certain types of data access, it may be necessary to definitely authenticate a user, such as, for example, in instances where security is important, such as when a user wishes to conduct a financial transaction. In addition, authentication may be based on a scale of varying levels of authentication depending on the type of task a user wishes to conduct. For example, if a user has been positively authenticated, the user may be assigned a highest level on a scale and may be authorized to conduct any transaction that corresponds to that highest level or lower. Accordingly, some lesser financial transactions, such as paying a predefined bill from a predefined account may not require the highest level of authentication, but may rather only require a lower level of authentication, such as one where a user has not been positively authenticated (e.g., an IP address of the device making the transaction request corresponds to a device previously used by the user, but the user himself/herself has not been positively authenticated) because account numbers, login information, and/or the like may not be required to process the predefined transaction. Authentication may also be completed by automatically gathering information about the user based on a combination of particular attributes that are extracted automatically by the TACC 300 and/or the authentication engine 302. For example, if a particular number of metadata attributes for a particular user match, the TACC 300 and/or the authentication engine 302 may assign a particular authentication level on the scale. That is, if metadata from information gathered by the user allows the TACC 300 and/or the authentication engine 302 to generally identify the user for the purposes of providing a weather forecast or the like to the user, the user may be assigned a particular authentication level that corresponds to the level necessary for a weather forecast or the like. The artificial intelligence and machine learning component 306 may further utilize fuzzy logic or the like to analyze auto-retrieved metadata and translate the data to a particular authentication level. Illustrative examples of metadata that may be used include, but are not limited to, geolocation of a device, an identification of the device, a recognized voice (e.g., the user's voice), an IP address, and the like.

As previously described herein, groups of users may also be authenticated. That is, there may be a need to combine information about a plurality of users in a common context, and it may not be practical to expect all users to actionably authenticate themselves. As such, use of auto authentication and fuzzy logic as described hereinabove may be used to identify a group of users and put them into a common context of usage. For example, if a plurality of users (and their respective electronic devices) are together in vehicle, the TACC 300 may utilize fuzzy logic to authenticate/identify all users in the vehicle. Then, based on the metadata, the TACC 300 may provide information, provide recommendations, and/or complete other tasks for all of the users accordingly by interfacing with each respective user's device. For example, the TACC 300 may provide recommendations such as restaurant recommendations, music playlist recommendations, and/or the like. If the users are in a rideshare vehicle, the TACC 300 may provide an ability to the users to pool the cost of the rideshare. Such group authentication may also be used for the purposes of referring users of a particular group for cost saving options, such as, for example, group purchase when booking a hotel or the like. The TACC 300 may provide such suggestions as part of a concierge service or the like that is transmitted to each of the user's devices, to an infotainment screen within the vehicle, and/or the like.

Figure 4:
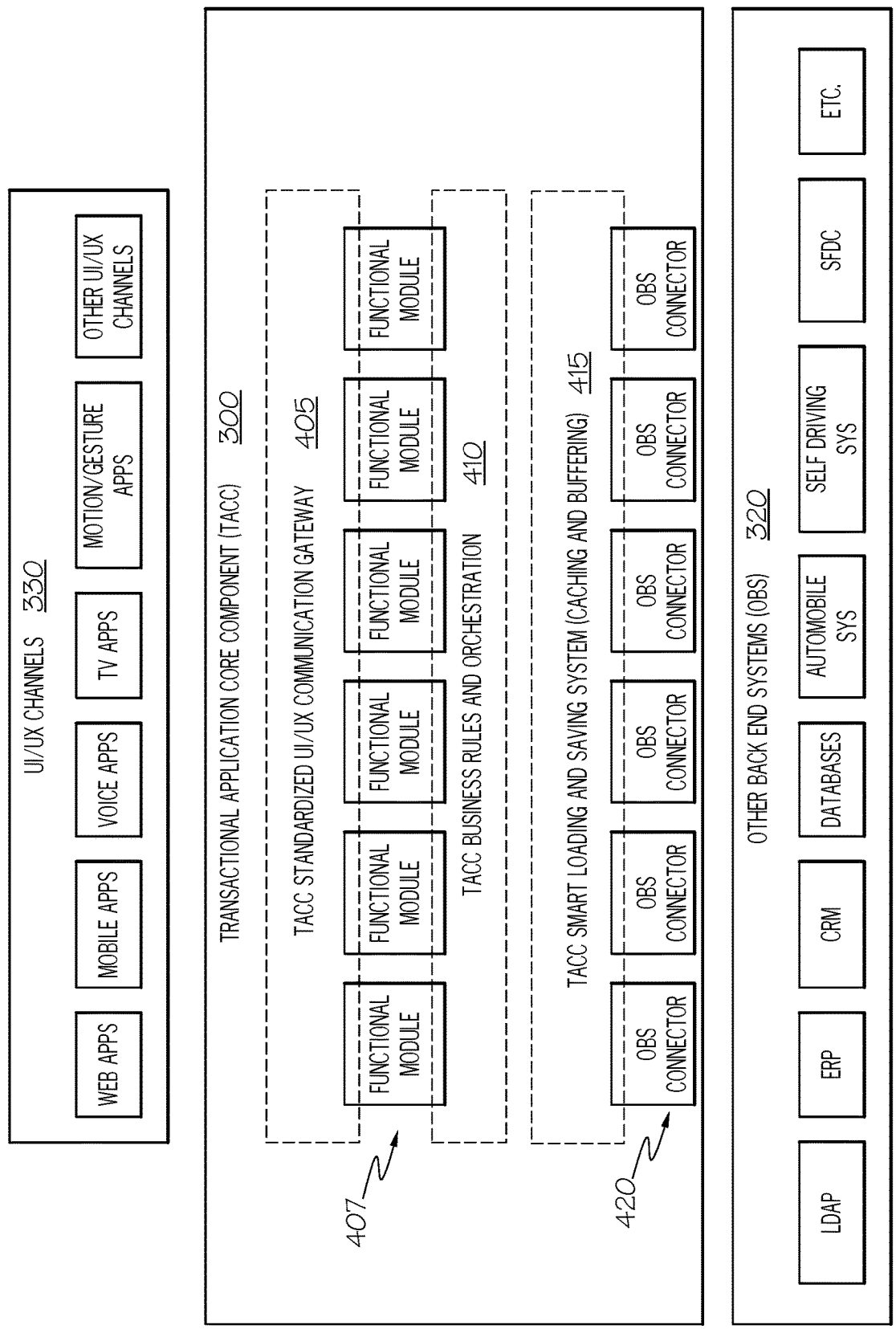
FIG. 4 depicts a block diagram of illustrative system architecture of software run by an illustrative system providing an integrated user interface according to one or more embodiments shown and described herein.

FIG. 4 is a block diagram depicting additional details regarding the architecture of the TACC 300, the backend systems 320, and one of the user interface channels 330. The architecture described with respect to FIG. 4 may be implemented via the various hardware and software modules described herein with respect to FIGS. 1 and 2A-2C. For example, the various software components of the TACC 300 as described with respect to FIG. 3 may provide a standardized UI/UX communication gateway 405, a business rules and orchestration component 410, and a smart loading and saving system 415. The standardized UI/UX communication gateway 405 may be communicatively coupled to the business rules and orchestration component 410 via one or more functional modules 407. That is, the one or more functional modules may be software modules embodied within one of the hardware components previously described herein to provide functionality for both the standardized UI/UX communication gateway 405 and the business rules and orchestration component 410. The UI/UX communication gateway 405 is generally a module that enables communication between the user interface channels 330 and the TACC 300. More specifically, the UI/UX communication gateway 405 standardizes the communication mechanism, which makes it possible to add (plug-in) a new UI channel without having to re-engineer or make any changes to the TACC 300. This enables the business rules and orchestration component 410 to be completely independent of how the user interface channels 330 access and use data. The functional modules 407 contain business functions that are used by the UI/UX communication gateway 405. In some embodiments, the UI/UX communication gateway 405 and/or the functional modules 407 may be part of the business rules and orchestration component 410. The business rules and orchestration component 410 generally contains core business logic. At least a portion (and sometimes all) of the logic required for application functionality may be contained within the business rules and orchestration component 410. The smart loading and saving system 415 may generally be an intelligent data access management component that stores certain information in a local cache and decides when to communicate with the backend systems 320 via the one or more OBS (other backend systems) connectors 420 as described hereinbelow. More specifically, the smart loading and saving system 415 may store information in a local cache and selectively decide when to communicate with the backend systems 320 via the OBS connectors 420. By using this intelligent caching mechanism, the number of times the application needs communicate with backend system is reduced substantially, thereby improving the performance. In addition, the smart loading and saving system 415 may be communicatively coupled via one or more OBS (other backend systems) connectors 420. That is, the OBS connectors 420 may be software modules stored on one or more hardware components that utilize one or more other hardware components to provide communications between the TACC 300 (particularly the smart loading and saving system 415 thereof) and the backend systems 320. The OBS connectors 420 may further enable communications to and from the backend systems 320 for the purposes of data insertion and retrieval.

The backend systems 320 may include software protocols, modules, data, and/or the like, such as (but not limited to) Lightweight Directory Access Protocol (LDAP), enterprise resource planning (ERP), customer relationship management (CRM), databases, automobile systems, self-driving systems, (salesforce developer community (SFDC), and/or the like. The various user interface/user experience channels in the user interface channels 330 may include, but are not limited to, web apps, mobile apps, voice apps, television apps, motion/gesture apps, and/or the like. Other backend systems and user interface/user experience channels not specifically listed herein should generally be understood and are included within the scope of the present disclosure.

Figure 5:
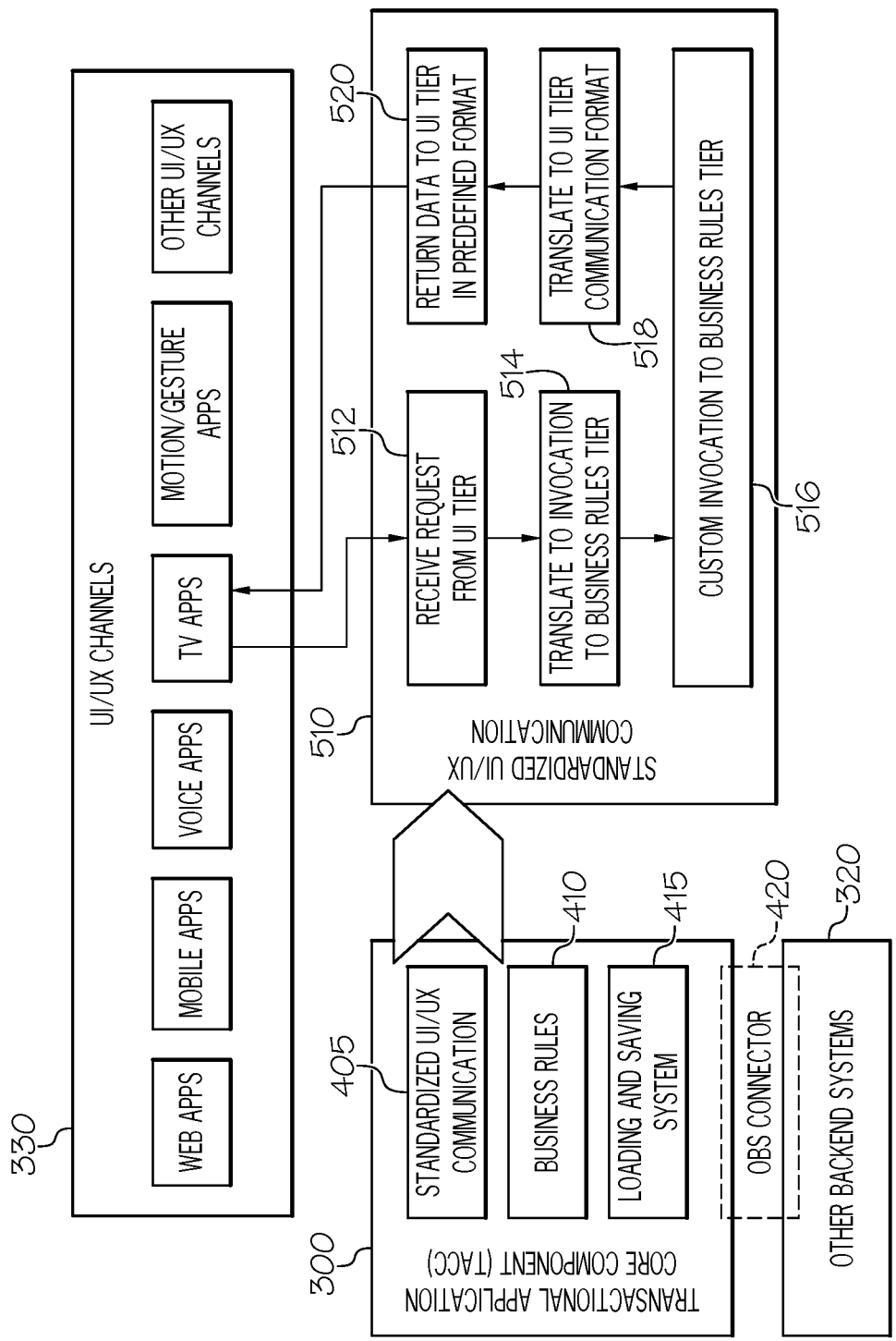
FIG. 5 depicts a block diagram of a plurality of functional components of an illustrative system providing an integrated user interface according to one or more embodiments shown and described herein.

FIG. 5 is a block diagram depicting additional details regarding the various software modules (and the functionality provided by the software modules) in the systems and methods described herein, particularly how the systems described herein communicate with various UI channels without the need for additional coding, thereby improving computer functionality as described herein. More specifically, as shown in FIG. 5, the ability to communicate with multiple user interface channels 330 is achieved by a standardization of the communication language, protocol, and payload, as depicted in box 510. The standardization takes advantage of one or more communications protocols, such as, for example, JavaScript object notation (JSON) protocols, transmission control and internet protocols (TCP/IP), and hypertext transfer protocol (HTTP). Such a standardization is implemented by the TACC, which is responsible for translating the data from the backend systems into a standardized format that is understood by the UI/UX tier. The TACC may also apply any applicable business rules to transform the data. Such an approach separates the UI/UX from the backend systems, thereby creating a layer of abstraction between the UI/UX and the backend systems, which may allow for implementation of any number of UI/UX channels without any code modification.

More specifically, various processes that are completed by the TACC 300 at box 510 include, but are not limited to, receiving a request from the user interface (UI) tier at block 512. That is, the user interface channels 330 may require information and/or data that is presented to the user. These are usually functional in nature (e.g., invoice information, current balance etc.). This constitutes a 'request'. In addition, the user interface channels 330 may also require a transmission of information and/or data or an action from the user to backend systems. This also constitutes a 'request'. A 'request' is always sent to the TACC 300, instead of being sent directly to the backend systems 320. In some embodiments, the business rules and orchestration component 410 processes these requests. The smart loading and saving system 415 determines whether a communication with a backend system 320 needs to occur.

Upon receiving such a request, the request is translated to invocation within the business rules tier at block 514 and is applied a custom invocation to the business rules tier at block 516. More specifically, the requests from the user interface channels 330 are made to the TACC 300 in a programming language, schema, and/or the like that the user interface channels 330 utilizes. Since different ones of the user interface channels 330 may utilize different programming languages, schema, and/or the like this request may be translated into a common language that can be used for the custom invocation at block 516, as each invocation is coded independently. Once the request is appropriately translated, the particular business rules are invoked at block 516 according to the request. To ensure that particular business rules are invoked only when necessary, the smart loading and saving system 415 may use artificial intelligence and/or machine learning to proactively cache data with the goal of reducing the number of times the backend systems 320 need to be invoked. It should be understood that this separation of translation and custom invocation may allow for a plurality of user interface channels 330 to be added without impacting the functionality of the TACC 300. Such a translation may utilize a particular component of the TACC 300, such the business rules and orchestration component 410, as described herein.

At block 518, the translated request is then further translated to the UI tier in a communication format. That is, similar to the need to translate a message coming in from the user interface channels 330 to the business rules tier (as described above), the information going back to the user interface channels 330 needs to be translated back to the language used by the respective user interface channel 330.

At block 520, the translated data is then returned to the UI tier in a predefined format. That is, the translated data and/or information that has been received is sent back to the user interface channels 330. Accordingly, blocks 514-518 allow for the translation to occur both on the receiving side (at block 514) and on the sending side (at block 518).

Figure 6:
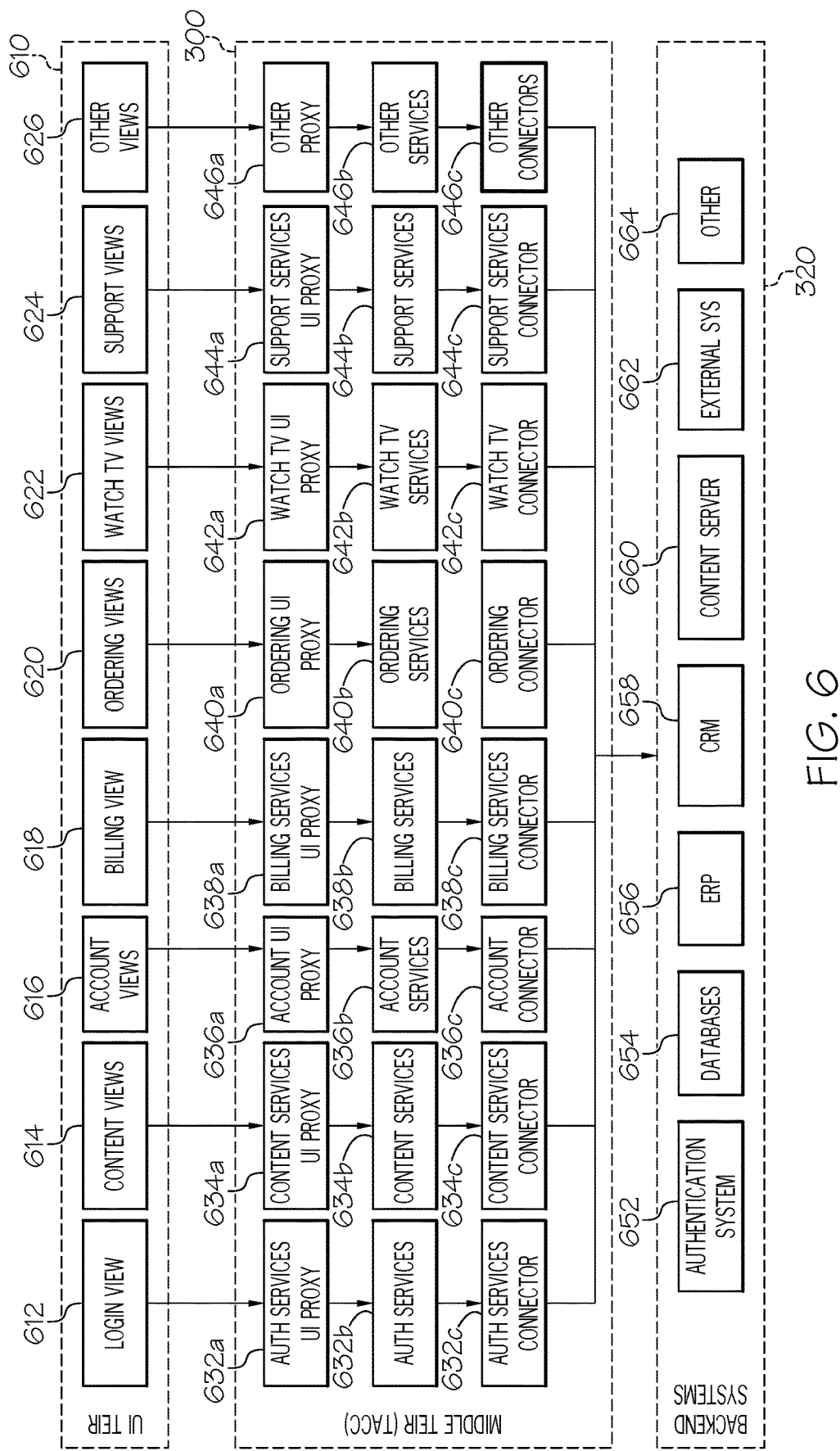
FIG. 6 depicts a block diagram of a plurality of additional functional components of an illustrative system providing an integrated user interface according to one or more embodiments shown and described herein.

Referring now to FIG. 6, the system may include a plurality of functional blocks that are each developed as an independent module in each tier so as to show how the modular nature of the systems and methods described herein can pick and choose between various functions. For example, the UI tier 610 may include one or more of the following: a login view 612, content views 614, account views 616, a billing view 618, ordering views 620, watch TV views 622, support views 624, and/or other views 626. The login view 612 may display a login interface to a user and/or may contain functionality for receiving user inputs for providing an initial login. The content views 614 may provide specific types of content to a user. The account views 616 may display particular user accounts to a user, such as, for example, bank accounts, credit card accounts, investment accounts, utility accounts, and/or the like. The billing view 618 may be an interface that is specifically related to particular bills that a user may have to pay, such as credit card bills, utility bills, mortgage bills, telephone, television, and internet bills, child care bills, rent bills, insurance bills, and/or the like. The ordering views 620 may provide an interface for a user to place a particular order at a website. The watch TV views 622 may an interface that provides streaming content to a user. The support views 624 may be an interface that provides the user with an ability to connect with technical support persons, connect to support chats, connect to support based message boards, and/or the like. The other views 626 may generally provide any other content that may be displayed to the user via the UI tier 610.

In another example, the TACC 300 (e.g., the middle tier) may include one or more proxies that are each communicatively coupled to the UI tier 610 to send and receive data relating to a particular one of the views within the UI tier 610 described above. In addition, each proxy is connected to a corresponding service and a corresponding connector, the corresponding connectors providing programming for connecting to the backend systems 320. That is, an authorization services proxy 632a, which sends and receives data to the UI tier 610 relating to the login view 612, may be connected to authorization services 632b and an authorization services connector 632c. Similarly, a content services UI proxy 634a, which sends and receives data to the UI tier 610 relating to the content views 614, may be connected to content services 634b and a content services connector 634c. An account UI proxy 636a, which sends and receives data to the UI tier 610 relating to the account views 616, may be connected to account services 636b and an account connector 636c. A billing services proxy 638a, which sends and receives data to the UI tier 610 relating to the billing view 618, may be connected to billing services 638b and a billing services connector 638c. An ordering UI proxy 640a, which sends and receives data to the UI tier 610 relating to the ordering views 620, may be connected to ordering services 640b and an ordering connector 640c. A watch TV UI proxy 642a, which sends and receives data to the UI tier 610 relating to the watch TV views 622, may be connected to watch TV services 642b and a watch TV connector 642c. A support services UI proxy 644a, which sends and receives data to the UI tier 610 relating to the support views 624, may be connected to support services 644*b* and a support services connector 644*c*. In addition, other proxies 646*a*, which send and receive data to the UI tier 610 relating to the any other views 626, may be connected to other services 646*b* and other connectors 646*c*.

In another example, the backend systems 320 may include, but are not limited to, an authentication system module 652, databases 654, an enterprise resource planning (ERP) module 656, a customer relationship management (CRM) module 658, a content server 660, external systems 662, and/or other modules 664.

Figure 7A:
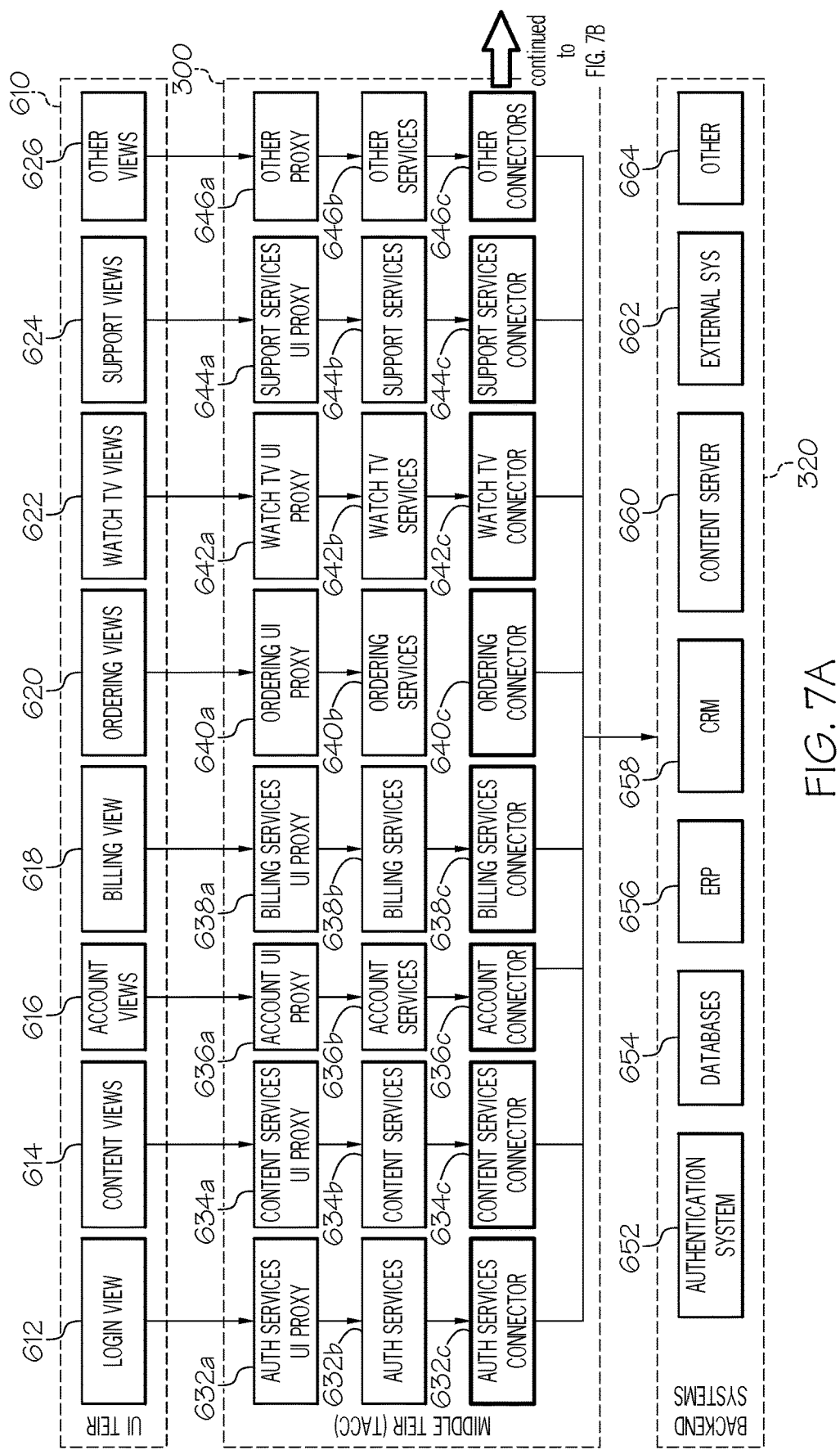
FIG. 7A depicts an illustrative integration of a backend system with the plurality of functional components of FIG. 6.
Figure 7B:
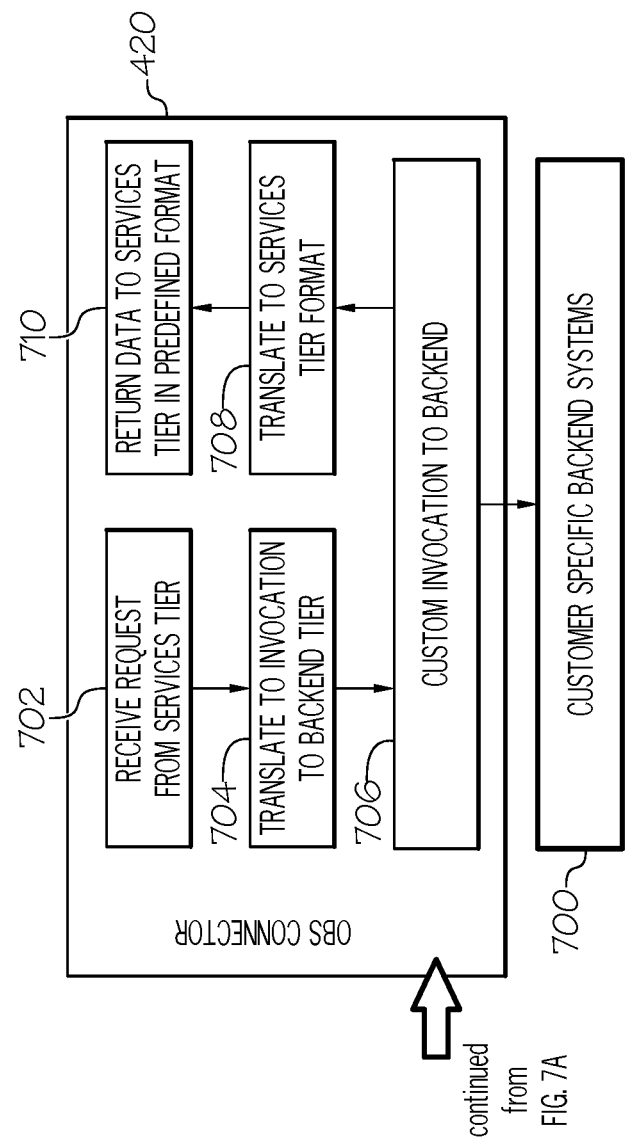
FIG. 7B further depicts an illustrative integration of a backend system with the plurality of functional components of FIG. 6.

In addition, as shown in FIGS. 7A and 7B, the system further integrates the backend systems 320 using the plurality of functional blocks described hereinabove. More specifically, each functional block is developed as an independent module in each tier and each functional area has a corresponding backend system connector. In some embodiments, the backend system connector may be user/implementation-specific. The backend system connector may communicate with a corresponding service layer via a predefined set of APIs that are provided by the TACC 300, thereby avoiding a need to modify any code in the TACC 300. When the system is implemented for a different service, the only code that need be changed is the connector used to access the backend system. That is, the code and the APIs remain the same.

More specifically, the TACC 300 communicates via one or more OBS connectors 420 with customer specific backend systems 700, which are included within the backend systems 320. Several functional steps are completed by the TACC 300 within the OBS connector 420, including receiving a request from a services tier at block 702, translating the request to invocation to the backend tier at block 704, generating a custom invocation to the backend at block 706, returning the data to the services tier in a predefined format at block 708, and translating the data to a services tier format at block 710. More specifically, a service tier (e.g., the authorization services 632*b*, the content services 634*b*, the account services 636*b*, the billing services 638*b*, the ordering services 640*b*, the watch TV services 642*b*, the support services 644*b* and the other services 646*b*) often need to retrieve information and/or data from the backend systems 320). This communication is facilitated by the OBS connector 420. By using the OBS connector 420, the service tier is de-coupled from the backend systems, thereby enabling easy replacement of backend systems or addition of new backend systems. At block 702 a request is received from the aforementioned services tier in a common language supported by the services tier. However, the specific backend system this request is targeted for may have its own language. Accordingly, at block 704, this request is translated to the particular language of the target backend system. Then, the actual invocation of the request is performed at block 706 to the target customer specific backend system 700 in the language the backend system understands and retrieves the requested data and/or information. That data is then translated at block 708 into the standardized format and/or language understood by the aforementioned services tier. Finally, Accordingly, the data and/or information is returned to the Services Tier in the translated language at block 710.

Figure 8:
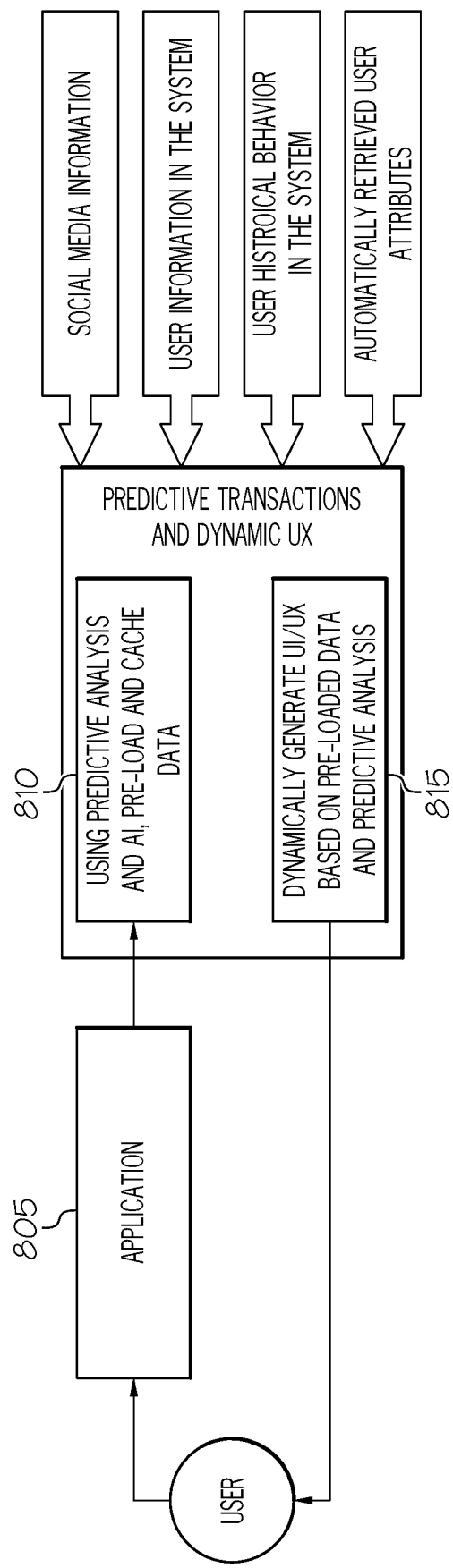
FIG. 8 depicts a flow diagram of an illustrative method of providing an integrated user interface according to one or more embodiments shown and described herein.

As previously described herein, the systems and methods described herein may be used to provide a user interface that avoids repetitive inputs from the user when interacting with the user interface. This may be completed, for example, by proactively proposing actions and providing a dynamically-generated user experience that is based on a historical pattern of behavior for the user. That is, the UI/UX adapts based on a historical pattern of usage by the user, which may be accomplished using machine learning and artificial intelligence, as described herein. FIG. 8 depicts an illustrative flow diagram of such a process. A user accesses an application at block 805, and the TACC uses predictive analysis and AI to pre-load and cache some data determined to be the data most likely to be accessed by the user at block 810 in addition to other data that may be obtained from other sources. Such a determination may be based on, for example, social media information, user information stored within the system, information regarding historical behavior of the user, and/or automatically retrieved user attributes. The user interface is then dynamically generated with the information and/or options based on such predictions at block 815, and the user interface is subsequently provided to the user at block 820. It should be understood that the various steps described herein with respect to FIG. 8 may be completed independently of the TACC (i.e., the TACC is not required to carry out the steps).

Figure 9:
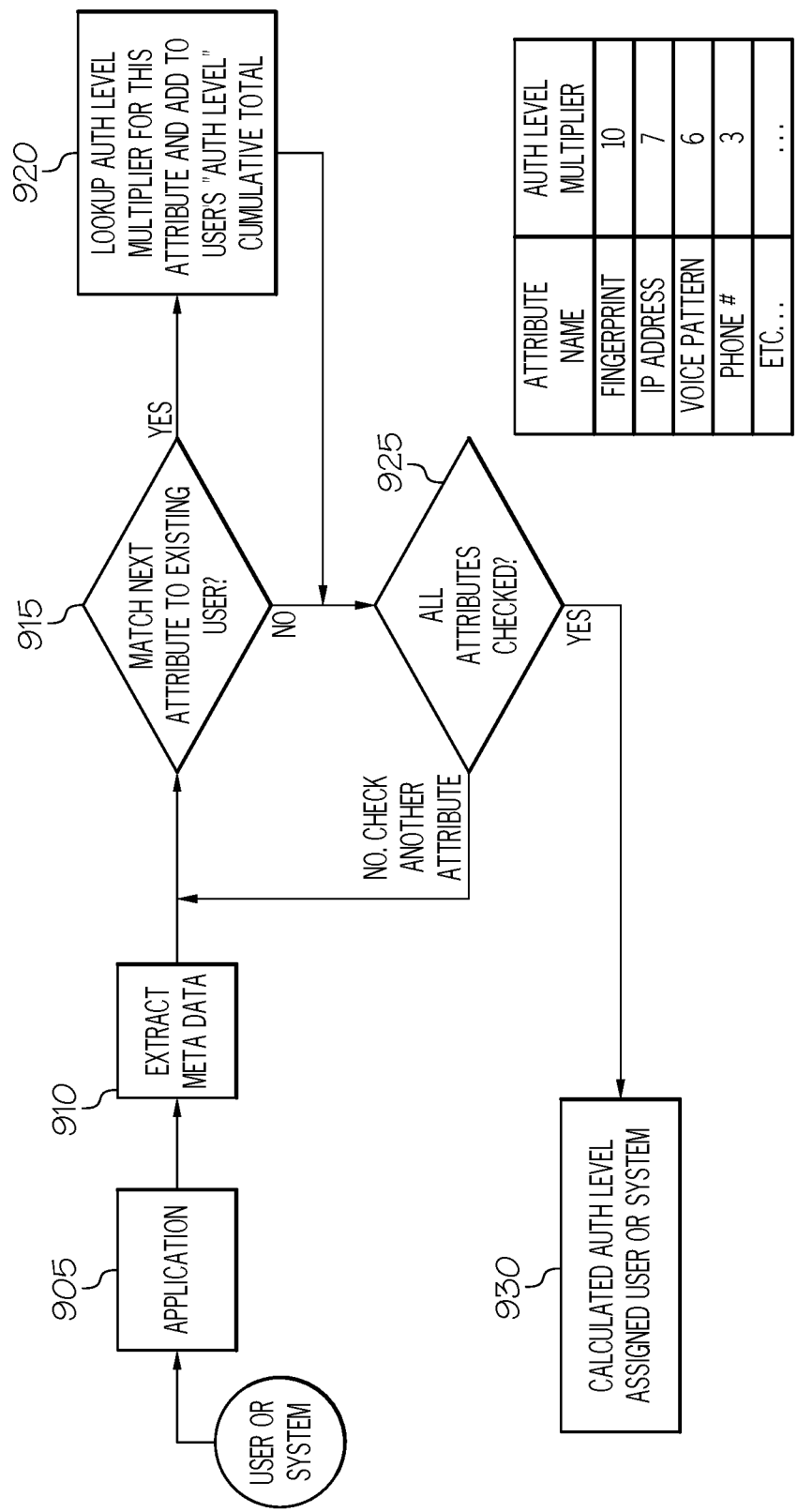
FIG. 9 depicts a flow diagram of an illustrative method of authenticating a user according to one or more embodiments shown and described herein.

As previously described herein, the systems and methods described herein may also be utilized to automatically authenticate/authorize and/or re-authenticate/re-authorize one or more users. That is, when a user accesses the systems and methods described herein via any of the user interface channels, the TACC may automatically retrieve certain metadata associated with the user, such as geolocation data, identification of the device used, a voice signature, an IP address, or the like. In addition, the TACC may access a set of rules that corresponds to the particular metadata that is accessed to match the metadata to a particular user. If a plurality of attributes match with a particular user, the user may be automatically authenticated, thereby bypassing a user ID/password login step that would otherwise be necessary or eliminating the need for a user ID/password altogether. It should be understood that the plurality of attributes may be a count of attributes or may be the result of a statistical analysis (e.g., a multiple linear regression analysis) to combine confidence levels of particular attributes to determine whether the attributes match a particular user). FIG. 9 depicts an illustrative flow diagram of such a process. More specifically, a user (or another device/system in instances where two systems are authenticating one another, as described herein) accesses the application at block 905 and metadata is extracted at block 910. As previously described, the metadata includes, but is not limited to, geolocation data, identification of a devices that is used, voice signature data, an IP address, facial recognition data, a phone number associated with the device, data regarding security question responses, token data, and/or the like. At block 915, a determination is made as to whether the metadata for a particular attribute matches an existing user. If so, a determination of the authorization level for the particular attribute is determined at block 920. Accordingly, at block 925, a determination is made as to whether all of the obtained metadata attributes have been checked. If not, the process may repeat at block 915 until all of the attributes have been checked. The process then moves to block 930 where an authorization level is determined based on the combined authorization levels determined for each of the attributes and the authorization corresponding to such a level is granted to the user or other device/system.

Figure 10:
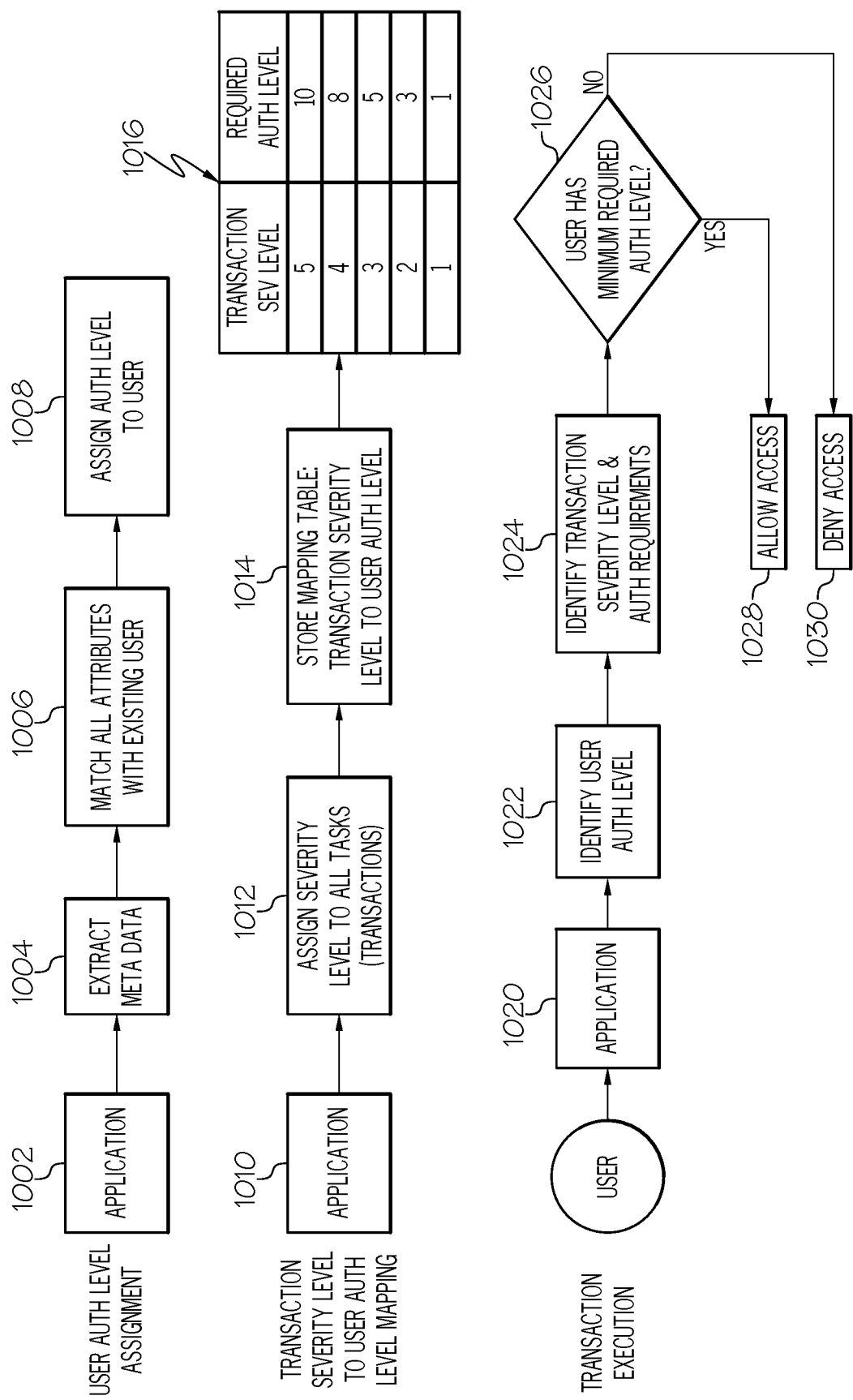
FIG. 10 depicts a flow diagram of additional details regarding the method of authenticating a user according to FIG. 9.

As shown in FIG. 10, if a user attempts to access a particular resource that requires a particular level of authentication, the system may determine the user's authentication level and either grant or deny access based on whether the user's authentication level has met the minimum requirements of the level the user desires to access.

This may first include determining a particular authentication level for the user, which includes, but is not limited to, the user accessing the application at block 1002, extraction of metadata at block 1004, matching all attributes with an existing user at block 1006, and assigning an authentication level to the user at block 1008. For example, a user may access the application on his/her mobile device at block 1002, and information regarding the mobile device, information provided by the user, and/or the like containing metadata may be extracted at block 1004. Illustrative metadata may include the mobile device's location, an identity of a connection to a particular data network, user-supplied information (e.g., a query entry), or the like. At block 1006, any attributes within the metadata may be used to authenticate the user. For example, if the metadata indicates that the device being used is a device that is typically used by the user, that the device is connected to a home network at an address that is the user's registered address, and/or the like, such metadata may be sufficient to authenticate the user for a particular authentication level, which is assigned at block 1008.

Once a particular authentication level for the user is determined, the system may determine whether the security level of the services to be accessed by the user are sufficient for the level of authentication that has been attained, as described herein. At block 1010, the user may access the application. The system may determine the severity level of the tasks the user wishes to complete within the application at block 1012. For example, if the tasks indicate that a user wishes to transfer funds from a bank account to another person, a high severity level may be assigned relative to tasks that indicate that the user only wants to access an account balance without seeing any details of the account. At block 1014, the system may store a mapping table 1016 (e.g., a table that indicates the transaction severity and a corresponding user authentication level to complete a particular transaction).

FIG. 11A depicts a table that indicates what level of authentication is granted for a particular attribute (on a scale of 1 to 10) and FIG. 11B depicts a table that indicates a required level of authentication for particular types of data access (on a scale of 1 to 10). It should be understood that the tables presented in FIGS. 11A and 11B are merely illustrative and that other attributes, scores, and types of data access may be included without departing from the scope of the present disclosure.

Referring again to FIG. 10, once the user has been assigned a particular authentication level and the transaction severity level has been determined, the transaction may be executed if the user has an authentication level that equals or exceeds that of the transaction severity level. For example, the user may access the application at block 1020, whereby the user authentication level is identified at block 1022 and the transaction severity level and authentication requirements are determined at block 1024. At block 1026, a determination may be made as to whether the user has the minimum required authentication level. If so, the user may be allowed access at block 1028. If not, the user may be denied access at block 1030.

While the above-mentioned processes are described with respect to the TACC, this is non-limiting. That is, the processes described with respect to FIGS. 9-10 and 11A-11B above may be completed without use of the TACC.

In addition to a single user authentication, groups of users may be authenticated, such as, for example, users that are in the same vehicle together, users attending the same event, users located in the same general vicinity, and/or the like. The users may be authenticated as a group using a lowest common denominator type authentication (e.g., the same or similar geolocation data) and/or areas having a greatest overlap of preference. For example, an individual user who is automatically authenticated as described herein may have close family members automatically authenticated with him/her, such as a spouse, children, or the like. Other users that have a connection to an individual may be based on data input by the user, social media data, similar biometric data, a particular degree of separation, and/or the like.

Figure 12:
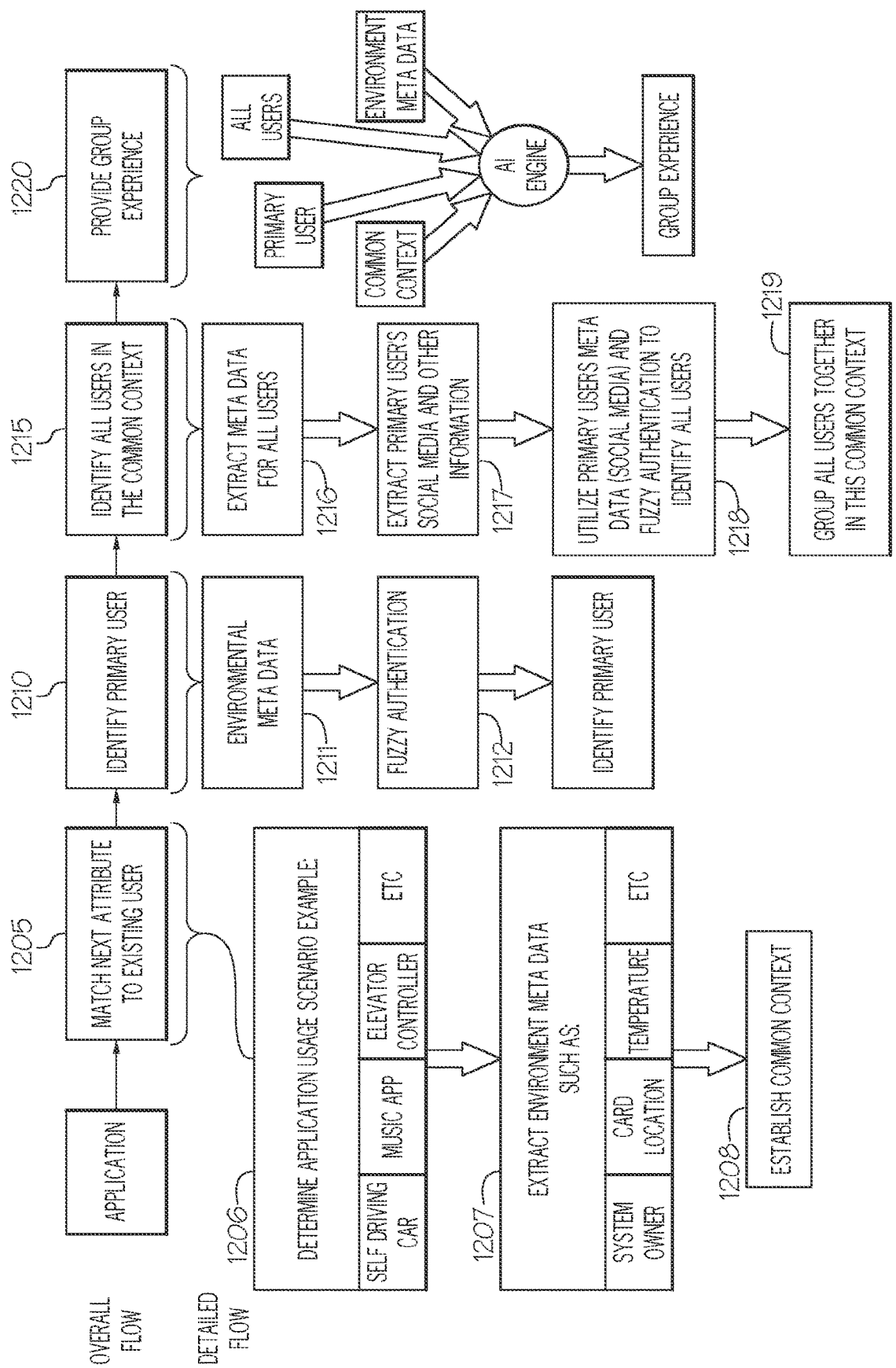
FIG. 12 depicts a flow diagram of an illustrative method of authenticating a group of users according to one or more embodiments shown and described herein.

FIG. 12 depicts a flow diagram of an illustrative method of group based authentication. As shown in FIG. 12, a common contact may be established at block 1205. For example, the common application usage may be determined and/or environmental metadata may be extracted in establishing a common context. More specifically, an application usage scenario may be determined at block 1206, such as, for example, a self-driving car, a music application, an elevator controller, and/or the like. Furthermore, at block 1207, environmental metadata may be extracted. Illustrative metadata includes, but is not limited to, system owner information, card location information, temperature information, and/or the like. Armed with the determined usage at block 1206 and the metadata extracted at block 1207, a common context may be established at block 1208.

At block 1210, a primary user may be identified. This may be completed, for example, by accessing environmental metadata at block 1211 and/or completing fuzzy authentication at block 1212, as previously described herein. At block, 1215, all of the users in the common context may be identified. This may be completed, for example, by extracting metadata for all users at block 1216, extracting the primary user's social media data and/or other related information at block 1217, utilizing the primary user's metadata and fuzzy authentication to identify all users at block 1218, and grouping users based on discovered common contexts at block 1219. The group experience is then provided at block 1220, which may include, for example, recommending a playlist, recommending a restaurant, recommending particular lodging, automatically selecting music in a particular location (e.g., an office elevator), selecting TV programming for a group, making auto selections for video gaming, and/or the like.

Figure 13:
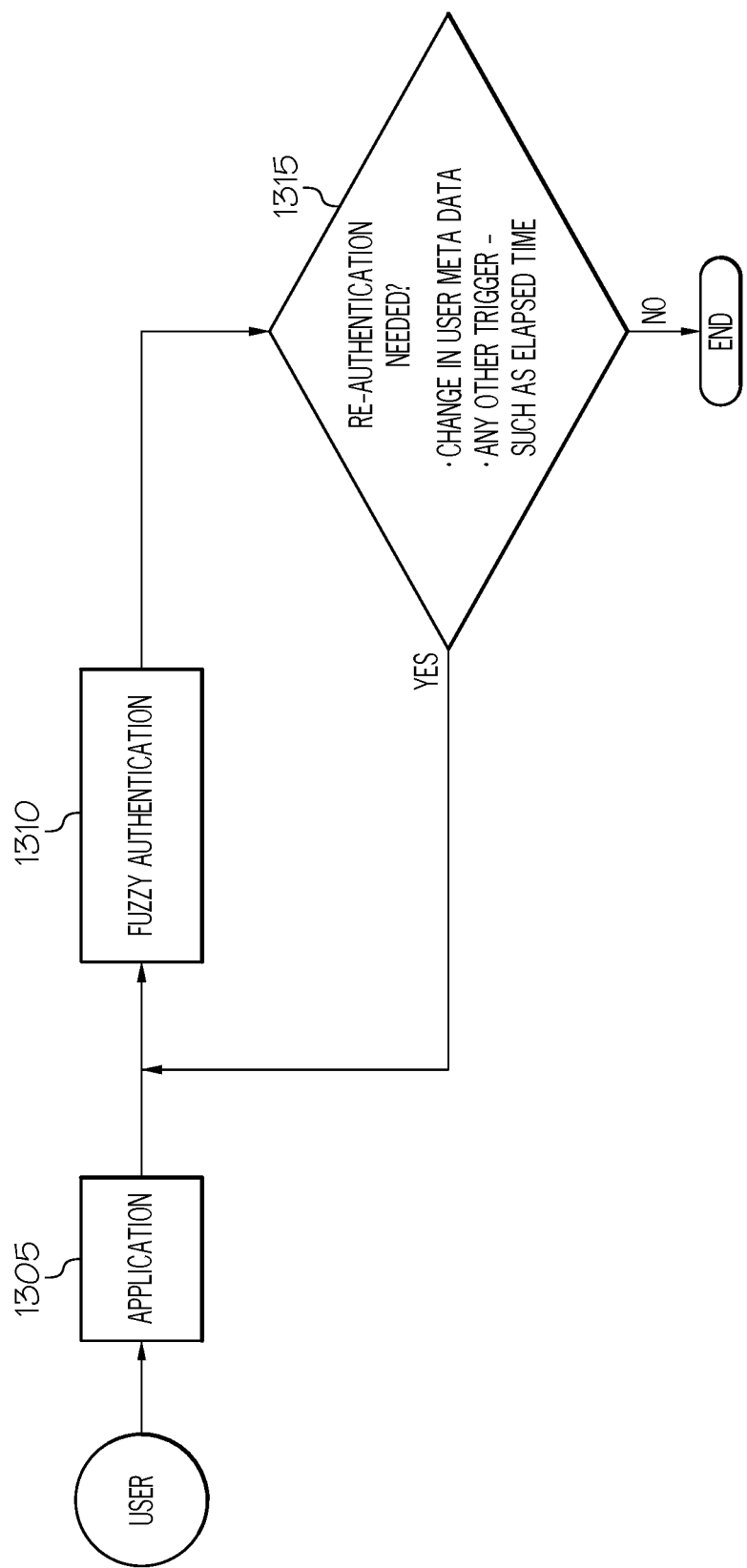
FIG. 13 depicts a flow diagram of an illustrative method of re-authenticating a user according to one or more embodiments shown and described herein.

FIG. 13 depicts a flow diagram of an illustrative method of re-authenticating a user such that the user need not manually re-authenticate, and also to ensure that a particular user is still using the device (i.e., to avoid instances when a stolen device that is still logged in to particular services can be accessed by an unauthorized user). At block 1305, the user may access the application and fuzzy authentication may be completed at block 1310 as previously described herein. At block 1315, a determination may be made as to whether re-authentication is necessary. This may be determined, for example, based on a change in the metadata that was used to initially authenticate the user, an elapse in time since the previous authentication, and/or the like. If re-authentication is necessary, the process may repeat at block 1310. Otherwise, the process may end.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for providing an integrated user interface comprising:
a central control server comprising a user interface and user experience engine, a backend application programming interface engine, and an artificial intelligence and machine learning software component;
a user device communicatively coupled to the central control server, the user device configured to provide a user interface adapted to provide at least one view displayed to a user and receive an input from the user via user device; and
a plurality of backend servers communicatively coupled to the central control server, wherein:
the backend application programming interface engine is adapted to generate and supply one or more application programming interfaces to the plurality of backend servers, the one or more application programming interfaces comprising one or more programming instructions thereon that direct a corresponding one of the plurality of backend servers to provide data to the central control server, wherein the plurality of backend servers are adapted to provide access to a plurality of different services and each of the plurality of backend servers utilizes an independent code, and
the user interface and user experience engine is adapted to dynamically generate the integrated user interface for a user such that the integrated user interface and a user experience dynamically change from user to user or situation to situation and the user experience and the integrated user interface are customized for the user based on a historical pattern of user behavior and provides the integrated user interface to the user device for display to the user,
wherein the user interface and user experience engine, using the artificial intelligence and machine learning software component, is adapted to automatically gather information regarding the historical pattern of user behavior from both behavior recorded by the central control server and behavior obtained from data received from the plurality of backend servers, analyze the information regarding the historical pattern of user behavior in a fuzzy environment to assign a level of confidence to one or more various data points within information underlying a predicted decision, determine whether the level of confidence meets a predetermined threshold, and when the level of confidence meets the predetermined threshold, complete a dynamic transaction with the predicted decision based on a determination of one or more portions of data received from the plurality of backend servers that is likely to be accessed by the user, preload the one or more portions of data into a cache, and provide the one or more portions of data via the integrated user interface,
wherein when the level of confidence is less than the predetermined threshold, the user interface and user experience engine is adapted to take at least one probing action to adjust the level of confidence.

2. The system of claim 1, wherein:
the artificial intelligence and machine learning software component:
determines one or more portions of the data received from the plurality of backend servers that is likely to be accessed by the user, and
provides the one or more portions of the data via the integrated user interface.

3. The system of claim 2, wherein the artificial intelligence and machine learning software component determines the one or more portions of the data based on at least one of previous use information and information received from one or more external sources.

4. The system of claim 2, wherein:
the central control server further comprises a cache; and
the artificial intelligence and machine learning software component temporarily stores the one or more portions of the data in the cache.

5. The system of claim 1, wherein the central control server further comprises an authentication engine, the authentication engine configured to dynamically authenticate the user based on the historical pattern of user behavior.

6. The system of claim 5, wherein the authentication engine authenticates the user based on a fuzzy logic analysis of metadata obtained regarding the user device.

7. The system of claim 5, wherein the authentication engine authenticates the user at a particular level of authentication based on metadata obtained regarding the user device.

8. The system of claim 5, wherein the authentication engine authenticates a plurality of users and groups the plurality of users into a group according to metadata similarities between each of the plurality of users.

9. The system of claim 8, wherein the central control server generates one or more suggestions to provide to the group and provides the one or more suggestions via the integrated user interface.

10. The system of claim 5, wherein the authentication engine re-authenticates the user after a period of time elapses or each time the user accesses the user device.

11. The system of claim 1, wherein the user interface adapts based on the historical pattern of user behavior.

12. The system of claim 11, wherein data predicted to be accessed is preloaded and cached and the integrated user interface is dynamically generated based on the prediction.

13. The system of claim 12, wherein the data predicted to be accessed is determined using artificial intelligence.

14. The system of claim 1, wherein the user interface and a user experience dynamically changes from one group of users to another group of users and the user interface is customized for the one or another group of users.

15. The system of claim 1, wherein the dynamic transaction comprises dynamically authenticating a user.

16. The system of claim 1, wherein the at least one probing action comprises a reactive action.

17. The system of claim 16, wherein the reactive action comprises automatically gathering information as an environment changes.

18. The system of claim 1, wherein the at least one probing action comprises a proactive action.

19. The system of claim 18, wherein the proactive action comprises requiring a user intervention to provide further information.

20. A system for providing an integrated user interface and for authentication, the system comprising:
a central control server comprising a user interface and user experience engine, a backend application programming interface engine, an artificial intelligence and machine learning software component, and an authentication engine;
a user device communicatively coupled to the central control server, the user device configured to provide a user interface adapted to provide at least one view displayed to a user and receive an input from the user via the user device;
a second device communicatively coupled to the central control server; and
a plurality of backend servers communicatively coupled to the central control server, wherein:
the backend application programming interface engine is adapted to generate and supply one or more application programming interfaces to the plurality of backend servers, the one or more application programming interfaces comprising one or more programming instructions thereon that direct a corresponding one of the plurality of backend servers to provide data to the central control server, wherein the plurality of backend servers provide access to a plurality of different services and each of the plurality of backend servers utilizes an independent code,
the user interface and user experience engine dynamically is adapted to generate the integrated user interface for a user such that the integrated user interface and a user experience dynamically change from user to user or situation to situation and the user experience and the integrated user interface are customized for the user based on a historical pattern of user behavior and provides the integrated user interface to the user device for display to the user, and
the authentication engine is adapted to authenticate the second device based on a fuzzy logic analysis of metadata obtained regarding the second device,
wherein the user interface and user experience engine, using the artificial intelligence and machine learning software component is adapted to automatically gather information regarding the historical pattern of user behavior from both behavior recorded by the central control server and behavior obtained from data received from the plurality of backend servers, analyze the information regarding the historical pattern of user behavior in a fuzzy environment to assign a level of confidence to one or more various data points within information underlying a predicted decision, determine whether the level of confidence meets a predetermined threshold, and when the level of confidence meets the predetermined threshold, complete a dynamic transaction with the predicted decision based on a determination of one or more portions of the data received from the plurality of backend servers that is likely to be accessed by the user, preload the one or more portions of data into a cache, and provide the one or more portions of data via the integrated user interface
wherein when the level of confidence is less than the predetermined threshold, the user interface and user experience engine takes at least one probing action to adjust the level of confidence.

21. The system of claim 20, wherein:
the artificial intelligence and machine learning software component:
determines one or more portions of the data received from the plurality of backend servers that is likely to be accessed by the user, and
provides the one or more portions of the data via the integrated user interface.

22. The system of claim 21, wherein the artificial intelligence and machine learning software component determines the one or more portions of the data based on at least one of previous use information and information received from one or more external sources.

23. The system of claim 20, wherein the authentication engine further authenticates the user based on a fuzzy logic analysis of metadata obtained regarding the user device.

24. The system of claim 20, wherein the authentication engine further authenticates the user at a particular level of authentication based on metadata obtained regarding the user device.

25. The system of claim 20, wherein the authentication engine further authenticates a plurality of users and groups the plurality of users into a group according to metadata similarities between each of the plurality of users.

26. The system of claim 25, wherein the central control server generates one or more suggestions to provide to the group and provides the one or more suggestions via the integrated user interface.

27. A system for providing an integrated user interface comprising:
a central control server comprising a user interface and user experience engine, a backend application programming interface engine, an artificial intelligence and machine learning software component, an artificial intelligence and machine learning software component, and an authentication engine;
a user device communicatively coupled to the central control server, the user device configured to provide a user interface adapted to provide at least one view displayed to a user and receive an input from the user via the user device; and
a plurality of backend servers communicatively coupled to the central control server, wherein:
the authentication engine is adapted to authenticate the user device,
the backend application programming interface engine is adapted to generate and supply one or more application programming interfaces to the plurality of backend servers, the one or more application programming interfaces comprising one or more programming instructions thereon that direct a corresponding one of the plurality of backend servers to provide data to the central control server, wherein the plurality of backend servers provide access to a plurality of different services and each of the plurality of backend servers utilizes an independent code,
the artificial intelligence and machine learning software component adapted to determine one or more portions of the data received from the backend servers that is likely to be accessed by a user and provides the one or more portions of the data, and
the user interface and user experience engine is adapted to dynamically generate the integrated user interface for a user such that the integrated user interface and a user experience dynamically change from user to user or situation to situation and the user experience and the integrated user interface are customized for the user based on a historical pattern of user behavior and the one or more portions of the data provided by the artificial intelligence and machine learning software component, and provides the integrated user interface to the user device for display to the user, wherein the user interface and user experience engine, using the artificial intelligence and machine learning software component is adapted to automatically gather information regarding the historical pattern of user behavior from both behavior recorded by the central control server and behavior obtained from data received from the plurality of backend servers, analyze the information regarding the historical pattern of user behavior in a fuzzy environment to assign a level of confidence to one or more various data points within information underlying a predicted decision, determine whether the level of confidence meets a predetermined threshold, and when the level of confidence meets the predetermined threshold, complete a dynamic transaction with the predicted decision based on a determination of one or more portions of the data received from the plurality of backend servers that is likely to be accessed by the user, preload of the one or more portions of data into a cache, and provide the one or more portions of data via the integrated user interface wherein when the level of confidence is less than the predetermined threshold, the user interface and user experience engine is adapted to take at least one probing action to adjust the level of confidence.

28. The system of claim 27, wherein the artificial intelligence and machine learning software component determines the one or more portions of the data based on at least one of previous use information and information received from one or more external sources.

29. The system of claim 27, wherein the authentication engine further authenticates a second device based on metadata received from the second device.

* * * * *